US012672120B2

(12) United States Patent
Wei et al.

(10) Patent No.: US 12,672,120 B2
(45) Date of Patent: Jun. 30, 2026

(54) POWER CONSISTENCY FOR UPLINK DEMODULATION REFERENCE SIGNAL (DMRS) BUNDLING

(71) Applicant: QUALCOMM Incorporated, San Diego, CA (US)

(72) Inventors: Chao Wei, Beijing (CN); Chenxi Hao, Beijing (CN); Gokul Sridharan, Sunnyvale, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 18/254,562

(22) PCT Filed: Jan. 13, 2021

(86) PCT No.: PCT/CN2021/071387
§ 371 (c)(1),
(2) Date: May 25, 2023

(87) PCT Pub. No.: WO2022/151009
PCT Pub. Date: Jul. 21, 2022

(65) Prior Publication Data
US 2024/0023080 A1      Jan. 18, 2024

(51) Int. Cl.
*H04W 72/044*       (2023.01)
*H04L 5/00*         (2006.01)
*H04W 72/563*       (2023.01)

(52) U.S. Cl.
CPC ....... *H04W 72/0473* (2013.01); *H04L 5/0051* (2013.01); *H04W 72/563* (2023.01)

(58) Field of Classification Search
CPC ............ H04W 72/0473; H04W 72/563; H04L 5/0051
See application file for complete search history.

(56) References Cited

U.S. PATENT DOCUMENTS

2020/0037255 A1    1/2020  Liu et al.
2020/0053659 A1*   2/2020  Wang ................ H04W 72/1268
(Continued)

FOREIGN PATENT DOCUMENTS

CN        110603881 A     12/2019
CN        110830195 A      2/2020
(Continued)

OTHER PUBLICATIONS

Supplementary European Search Report—EP21918226—Search Authority—The Hague—Sep. 6, 2024.
(Continued)

*Primary Examiner* — Derrick V Rose
(74) *Attorney, Agent, or Firm* — Paterson & Sheridan, L.L.P.

(57)          ABSTRACT

Certain aspects of the present disclosure provide techniques for providing power consistency in uplink demodulation reference signal (DMRS) bundling. A method that may be performed by a user equipment (UE) includes identifying that a first uplink transmission having DMRS bundling overlaps in time with a second uplink transmission in one or more transmission occasions. The method also includes allocating, in response to the identification, a transmit power among the first uplink transmission and the second uplink transmission at the one or more transmission occasions based on the first uplink transmission having the DMRS bundling. The method further includes transmitting at least one of the first uplink transmission or the second uplink transmission in the one or more transmission occasions at the allocated transmit power.

30 Claims, 13 Drawing Sheets

(56)  References Cited

U.S. PATENT DOCUMENTS

| | | | |
|---|---|---|---|
| 2020/0220681 A1 | 7/2020 | Yang et al. | |
| 2022/0045813 A1* | 2/2022 | Karmoose | H04W 72/1268 |
| 2023/0291523 A1* | 9/2023 | Hasegawa | H04W 52/281 |

FOREIGN PATENT DOCUMENTS

| | | | |
|---|---|---|---|
| CN | 111247857 A | 6/2020 |
| EP | 3703453 A1 | 9/2020 |
| JP | 2021500822 A | 1/2021 |
| WO | 2019156466 A1 | 8/2019 |

OTHER PUBLICATIONS

3GPP 3rd Generation Partnership Project, Technical Specification Group Radio Access Network, Study on NR coverage enhancements (Release 17), 3GPP TR 38.830, V1.0.0, (Dec. 2020), Dec. 31, 2020, (Dec. 31, 2020), section 6.1.3, pp. 1-92.

China Telecom: "Discussion on PUCCH Coverage Enhancements," 3GPP TSG RAN WG1 #103-e, R1-2007995, e-Meeting, Oct. 26-Nov. 13, 2020, Nov. 13, 2020 (Nov. 13, 2020), XP051939425, 3 pages, Retrieved from the Internet: URL: https://ftp.3gpp.org/tsg_ran/WG1_RL1/TSGR1_103-e/Docs/R1-2007995.zip R1-2007995.doc [Retrieved on Oct. 16, 2020] The Whole Document.

CMCC: "Discussion on the PUSCH Coverage Enhancement," 3GPP TSG RAN WG1 #103-e, R1-2008026, e-Meeting, Oct. 26-Nov. 13, 2020, Nov. 13, 2020 (Nov. 13, 2020), sections 2-3, 5 pages.

International Search Report and Written Opinion—PCT/CN2021/071387—ISA/EPO—Oct. 15, 2021.

* cited by examiner

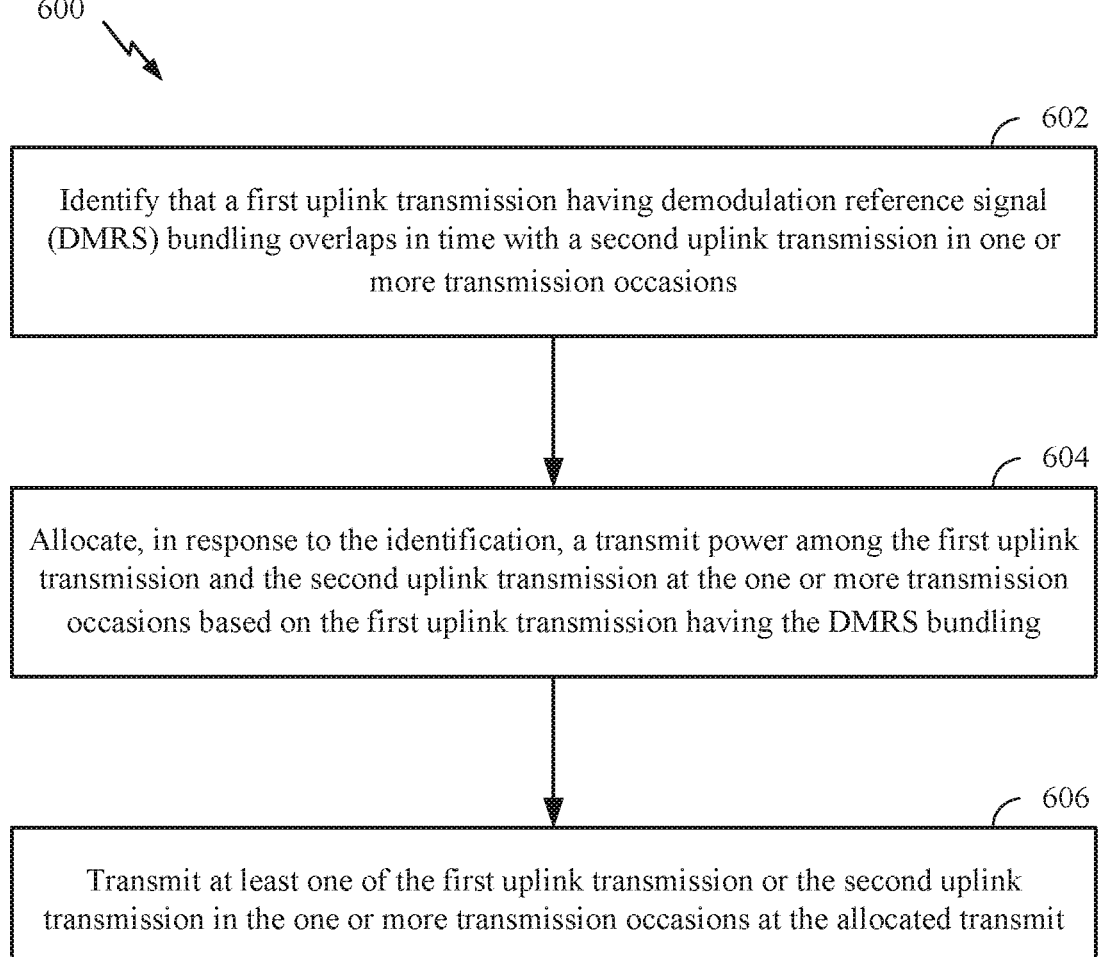

600

602

Identify that a first uplink transmission having demodulation reference signal (DMRS) bundling overlaps in time with a second uplink transmission in one or more transmission occasions

604

Allocate, in response to the identification, a transmit power among the first uplink transmission and the second uplink transmission at the one or more transmission occasions based on the first uplink transmission having the DMRS bundling

606

Transmit at least one of the first uplink transmission or the second uplink transmission in the one or more transmission occasions at the allocated transmit power

FIG. 6

No assumption of coherence by gNB in case of collision no
matter whether $P_1+P_2 > P_{c,max}$ or not No assumption of coherence by gNB in case of collision no
matter whether $P_1+P_2 > P_{c,max}$ or not

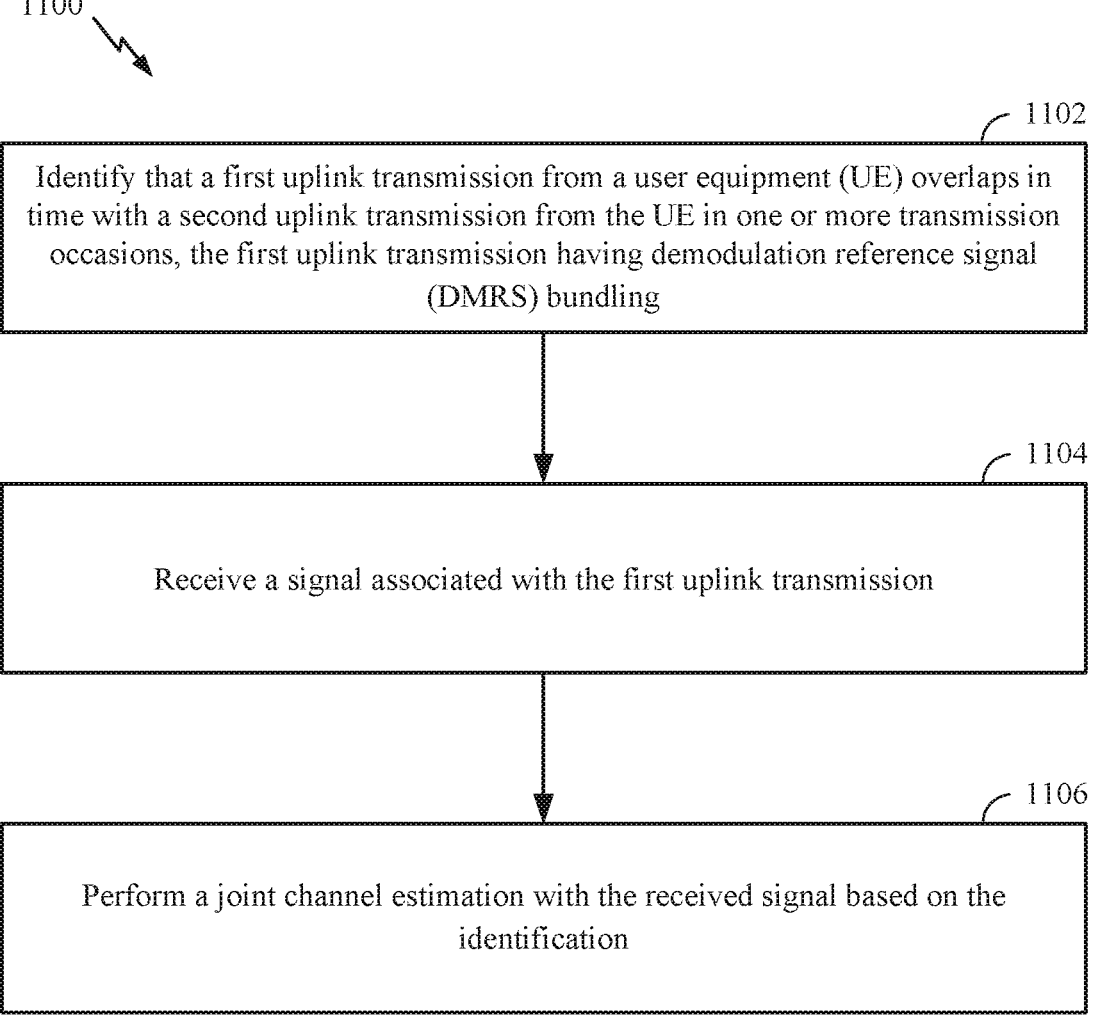

1100

1102

Identify that a first uplink transmission from a user equipment (UE) overlaps in time with a second uplink transmission from the UE in one or more transmission occasions, the first uplink transmission having demodulation reference signal (DMRS) bundling

1104

Receive a signal associated with the first uplink transmission

1106

Perform a joint channel estimation with the received signal based on the identification

POWER CONSISTENCY FOR UPLINK DEMODULATION REFERENCE SIGNAL (DMRS) BUNDLING

CROSS-REFERENCE TO RELATED APPLICATION(S)

This application is a national stage application under 35 U.S.C. 371 of PCT/CN2021/071387, filed Jan. 13, 2021, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for providing power consistency in uplink demodulation reference signal (DMRS) bundling.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include desirable uplink performance via demodulation reference signal (DMRS) bundling and/or joint channel estimation.

Certain aspects of the subject matter described in this disclosure can be implemented in a method for wireless communication by a user equipment (UE). The method generally includes identifying that a first uplink transmission having DMRS bundling overlaps in time with a second uplink transmission in one or more transmission occasions. The method also includes allocating, in response to the identification, a transmit power among the first uplink transmission and the second uplink transmission at the one or more transmission occasions based on the first uplink transmission having the DMRS bundling. The method further includes transmitting at least one of the first uplink transmission or the second uplink transmission in the one or more transmission occasions at the allocated transmit power.

Certain aspects of the subject matter described in this disclosure can be implemented in a method for wireless communication by a network entity. The method generally includes identifying that a first uplink transmission from a UE overlaps in time with a second uplink transmission from the UE in one or more transmission occasions, the first uplink transmission having DMRS bundling. The method also includes receiving a signal associated with the first uplink transmission. The method further includes performing a joint channel estimation with the received signal based on the identification.

Certain aspects of the subject matter described in this disclosure can be implemented in an apparatus for wireless communication. The apparatus generally includes a memory, a process, and a transmitter. The processor is coupled to the memory, and the processor and the memory are configured to identify that a first uplink transmission having DMRS bundling overlaps in time with a second uplink transmission in one or more transmission occasions, and allocate, in response to the identification, a transmit power among the first uplink transmission and the second uplink transmission at the one or more transmission occasions based on the first uplink transmission having the DMRS bundling. The transmitter is configured to transmit at least one of the first uplink transmission or the second uplink transmission in the one or more transmission occasions at the allocated transmit power.

Certain aspects of the subject matter described in this disclosure can be implemented in an apparatus for wireless communication. The apparatus generally includes a memory, a process, and a receiver. The receiver is configured to receive, from a UE, a signal associated with a first uplink transmission. The processor is coupled to the memory, and the processor and the memory are configured to: identify that a first uplink transmission from the UE overlaps in time with a second uplink transmission from the UE in one or more transmission occasions, the first uplink transmission having DMRS bundling, and perform a joint channel estimation with the received signal based on the identification.

Certain aspects of the subject matter described in this disclosure can be implemented in an apparatus for wireless communication. The apparatus generally includes means for identifying that a first uplink transmission having DMRS bundling overlaps in time with a second uplink transmission in one or more transmission occasions; means for allocating, in response to the identification, a transmit power among the first uplink transmission and the second uplink transmission at the one or more transmission occasions based on the first uplink transmission having the DMRS bundling; and means for transmitting at least one of the first uplink transmission or the second uplink transmission in the one or more transmission occasions at the allocated transmit power.

Certain aspects of the subject matter described in this disclosure can be implemented in an apparatus for wireless communication. The apparatus generally includes means for identifying that a first uplink transmission from a UE overlaps in time with a second uplink transmission from the UE in one or more transmission occasions, the first uplink transmission having DMRS bundling; means for receiving a signal associated with the first uplink transmission; and means for performing a joint channel estimation with the received signal based on the identification.

Certain aspects of the subject matter described in this disclosure can be implemented in a computer-readable medium having instructions stored thereon for identifying that a first uplink transmission having DMRS bundling overlaps in time with a second uplink transmission in one or more transmission occasions; allocating, in response to the identification, a transmit power among the first uplink transmission and the second uplink transmission at the one or more transmission occasions based on the first uplink transmission having the DMRS bundling; and transmitting at least one of the first uplink transmission or the second uplink transmission in the one or more transmission occasions at the allocated transmit power.

Certain aspects of the subject matter described in this disclosure can be implemented in a computer-readable medium having instructions stored thereon for identifying that a first uplink transmission from a UE overlaps in time with a second uplink transmission from the UE in one or more transmission occasions, the first uplink transmission having DMRS bundling; receiving a signal associated with the first uplink transmission; and performing a joint channel estimation with the received signal based on the identification.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

FIG. 6 is a flow diagram illustrating example operations for wireless communication by a UE, in accordance with certain aspects of the present disclosure.

FIG. 11 is a flow diagram illustrating example operations for wireless communication by a network entity, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
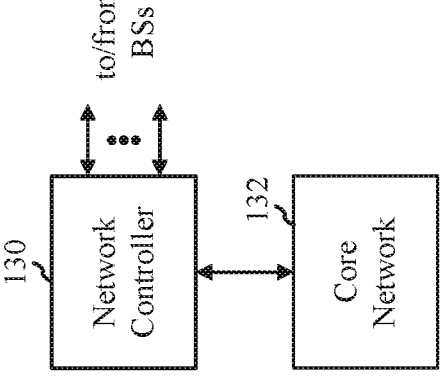
FIG. 1 is a block diagram conceptually illustrating an example wireless communication network, in accordance with certain aspects of the present disclosure.

Aspects of the present disclosure provide apparatus, methods, processing systems, and computer readable mediums for providing transmit power consistency for transmissions with demodulation reference signal (DMRS) bundling. In certain cases, the prioritizations for transmission power reductions may take into account a transmission with DMRS bundling and allocate a consistent transmit power across at least a portion of the transmission with DMRS bundling. For example, the prioritizations for transmission power reductions may provide conflict resolution for a transmission with DMRS bundling through a separate rank for DMRS bundling in the priority order (e.g., a New Radio priority order), cancellation of a portion of a colliding transmission (such as a lower priority transmission), or separating DMRS bundling along the overlapping transmission occasion.

The following description provides examples of power consistency for uplink DMRS bundling in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE.

Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

As shown in FIG. 1, the BS 110a includes a channel estimation manager 112 that determines which transmission occasions associated with a transmission from the UE 120a has DMRS bundling for joint channel estimation, in accordance with aspects of the present disclosure. The UE 120a includes a DMRS bundling manager 122 that allocates transmit power among a transmission with DMRS bundling and another overlapping transmission, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
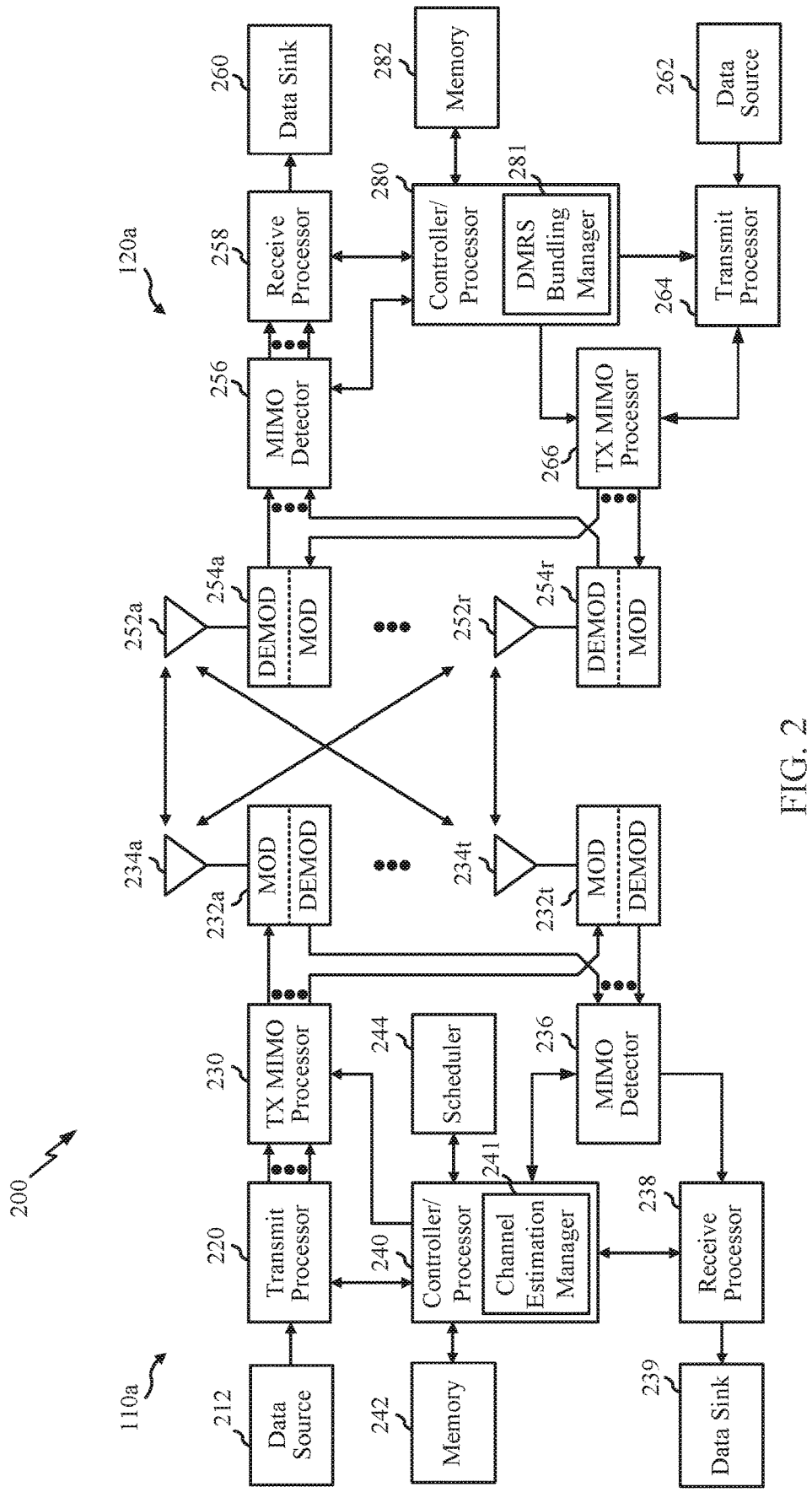
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a channel estimate manager 241 that determines which transmission occasions associated with a transmission from the UE 120a has DMRS bundling for joint channel estimation, according to aspects described herein. As shown in FIG. 2, the controller/processor 280 of the UE 120a has a DMRS bundling manager 281 that allocates transmit power among a transmission with DMRS bundling and another overlapping transmission, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
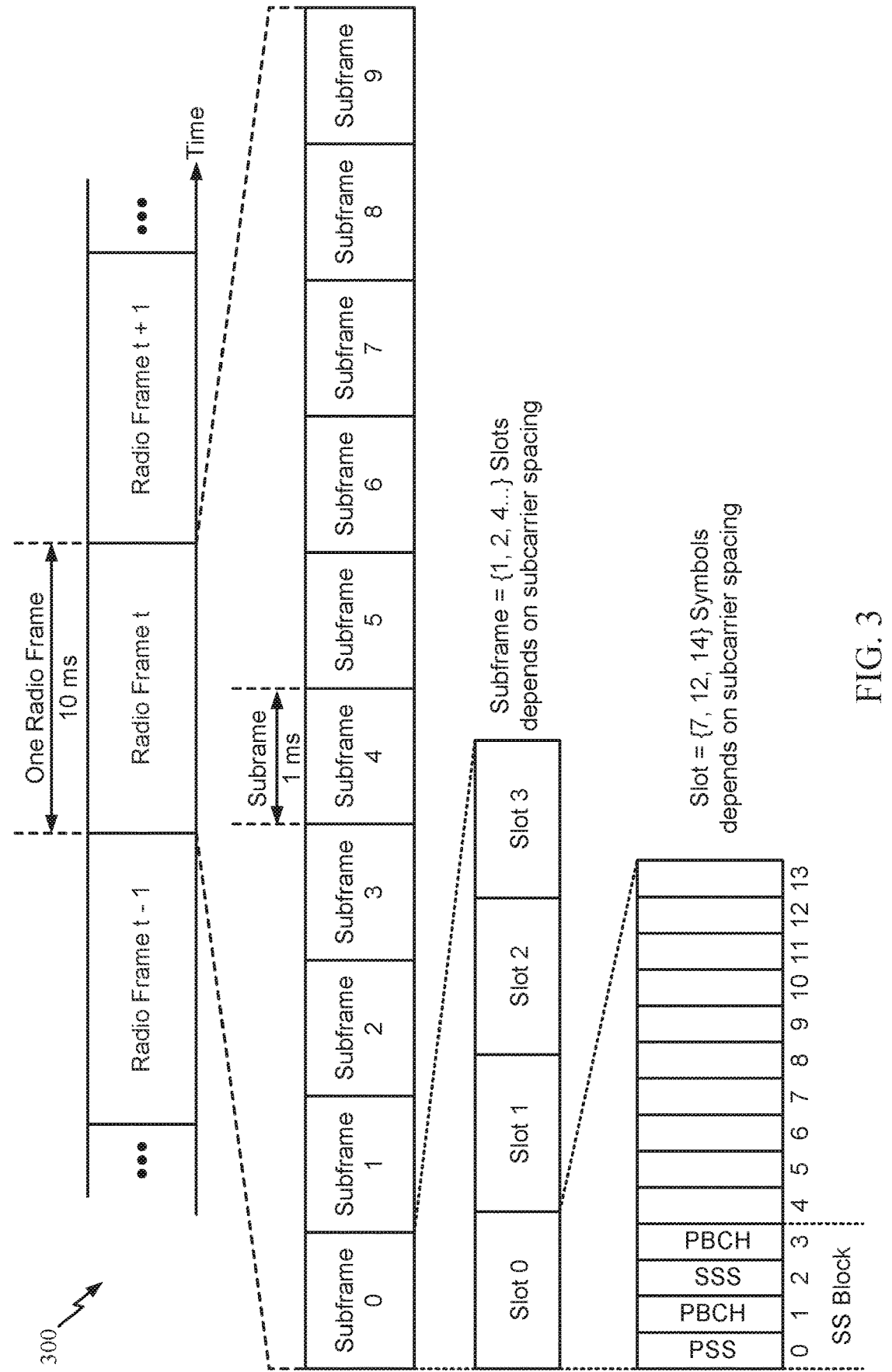
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., downlink (DL), uplink (UL), or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst periodicity, system frame number, etc. The SSBs may be organized into an SS burst to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as an SS burst. SSBs in an SS burst may be transmitted in the same frequency region, while SSBs in different SS bursts can be transmitted at different frequency regions.

In certain wireless communication systems (e.g., 5G NR systems), a transmitter may perform DMRS time domain bundling (also referred to herein as DMRS bundling), where a DMRS may be coherently transmitted over different transmission occasions (e.g., mini-slots or slots) using the same power and same precoder. For example, the transmitter may transmit one or more data packets with a DMRS having coherent phase (i.e., phase continuity) and consistent transmit power across different transmission occasions, such as consecutive transmission occasions or non-consecutive transmission occasions. At the receiver, the DMRS over different transmission occasions can be coherently filtered to enhance the accuracy of channel estimation. That is, the receiver may perform joint channel estimation over multiple transmission occasions (e.g., mini-slots or slots). DMRS bundling and/or joint channel estimation for uplink channels (e.g., PUSCH or PUCCH) may enable various coverage enhancements such as joint channel estimation over consecutive or non-consecutive uplink transmissions or inter-slot frequency hopping with inter-slot bundling.

Figure 4:
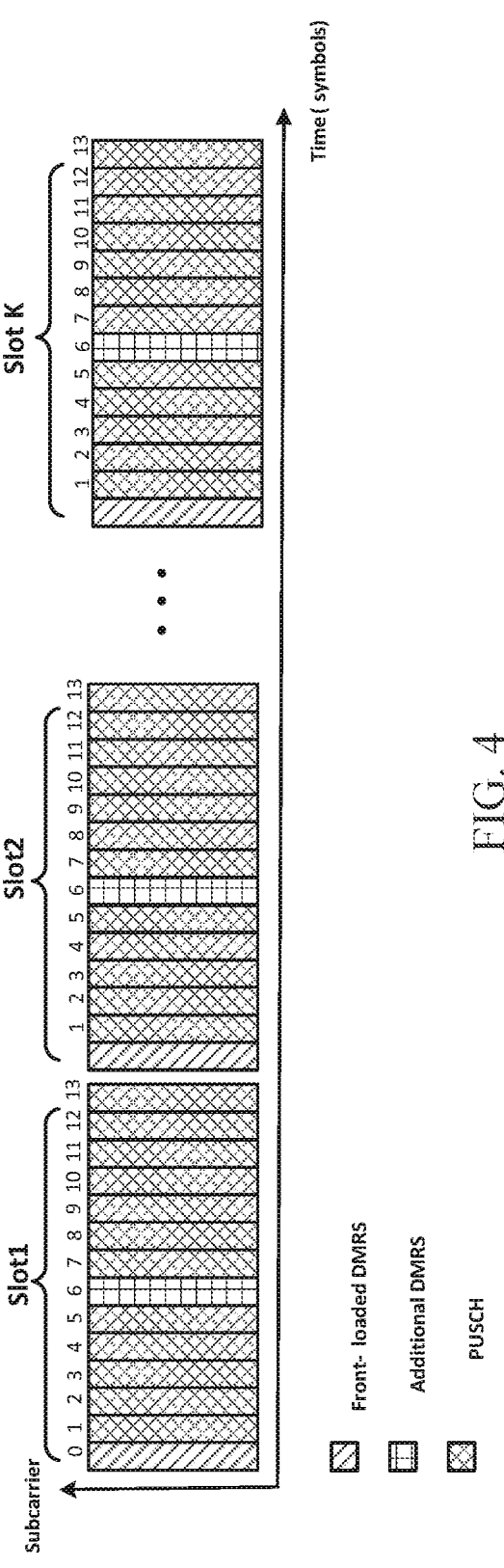
FIG. 4 is a diagram illustrating an example of the symbol positions of demodulation reference signals (DMRSs) in multiple slots, in accordance with certain aspects of the present disclosure.

FIG. 4 is a diagram illustrating an example of the symbol positions of DMRSs in slots 1 through K for a PUSCH, in accordance with certain aspects of the present disclosure. The transmitter may perform DMRS bundling across slots 1 through K. In certain cases, the DMRS bundling may be for consecutive slots or non-consecutive slots. For example, the DMRS bundling may be performed for slots 1 through K except for slot 2.

In certain wireless communication systems (e.g., 5G NR systems), the UE may have prioritizations for transmission power reductions when two or more uplink carriers are scheduled to transmit at the same transmission occasion. For single cell operation with two uplink carriers or for operation with carrier aggregation, if a total UE transmit power for PUSCH or PUCCH or Physical Random Access Channel (PRACH) or SRS transmissions on serving cells in a frequency range in a respective transmission occasion i would exceed $\hat{P}_{CMAX}(i)$, where $\hat{P}_{CMAX}(i)$ is the linear value of $P_{CMAX}(i)$ in transmission occasion i, the UE allocates power to PUSCH/PUCCH/PRACH/SRS transmissions according to a given priority order so that the total UE transmit power for transmissions on serving cells in the frequency range is smaller than or equal to $\hat{P}_{CMAX}(i)$ for that frequency range in every symbol of transmission occasion i. An example priority order (which may be referred to as the NR priority order) in descending order is as follows:

(1) PRACH transmission on the Primary serving cell (Pcell);

(2) PUCCH/PUSCH transmission with higher priority index (e.g., priority index of 1 used for URLLC and priority index of 0 for eMBB);

(3) for PUCCH/PUSCH transmissions with the same priority index:

(a) PUCCH transmission with hybrid automatic repeat request acknowledgement (HARQ-ACK) information, and/or scheduling request (SR), and/or link recovery request (LRR), or PUSCH transmission with HARQ-ACK information, (b) PUSCH/PUCCH carrying CSI, and (c) PUSCH transmission without HARQ-ACK information or CSI, and, for Type-2 random access procedure, PUSCH transmission on the PCell; and (4) SRS transmission, with aperiodic SRS having higher priority than semi-persistent and/or periodic SRS, or PRACH transmission on a serving cell other than the PCell (such as the Secondary serving cell (Scell)).

In this example, the PRACH transmission on the Pcell has the highest priority or rank in the priority order, and the SRS or PRACH transmission on the Scell has the lowest priority or rank in the priority order. For example, the UE may allocate more transmit power to an PRACH transmission on the Pcell than an PRACH transmission on the Scell according to the priority order. In case of transmissions having the same priority order and for operation with carrier aggregation, the UE may prioritize power allocation for transmissions on the Pcell over transmissions on the Scell. In case of transmissions having the same priority order and for operation with two uplink carriers (e.g., a supplementary carrier and non-supplementary carrier), the UE may prioritize power allocation for transmissions on the carrier where the UE is configured to transmit PUCCH. If PUCCH is not configured for any of the two UL carriers, the UE may prioritize power allocation for transmissions on the non-supplementary UL carrier.

In aspects, a transmission may be associated with a priority index, such as an ordinal number (e.g., 0, 1, 2, 3, etc., where a higher number represents a higher priority). In NR, the priority index may have a value of 0 or 1. For example, downlink control information (DCI) that schedules an uplink transmission may include a priority index associated with the transmission. The priority index may be used to determine the prioritization as described herein. As an example, a PUCCH/PUSCH transmission with higher priority index (e.g., a priority index of 1) may take priority over another PUCCH/PUSCH transmission with a lower priority index (e.g., a priority index of 0).

Figure 5:
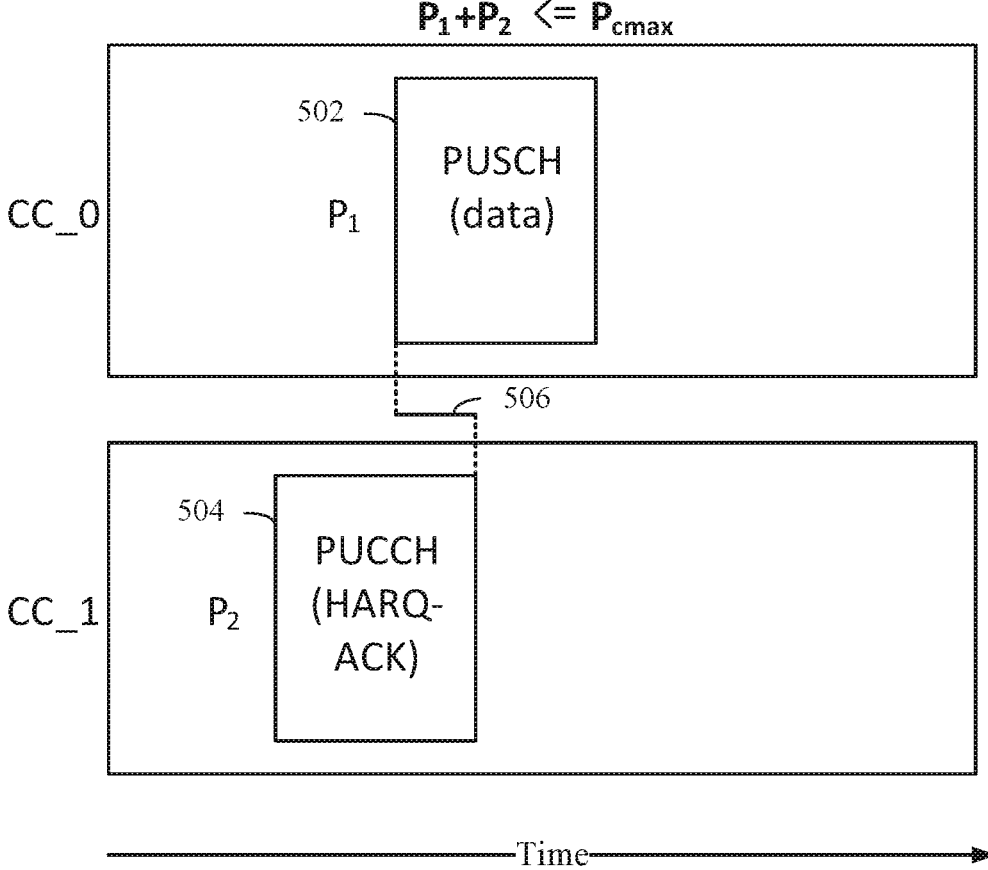
FIG. 5 is a diagram illustrating an example of transmission overlapping in time, in accordance with certain aspects of the present disclosure.

FIG. 5 is a diagram illustrating an example of a PUSCH transmission 502 on a first component carrier (CC_0) and a PUCCH transmission 504 on a second component carrier (CC_1) overlapping in one or more transmission occasions 506, in accordance with certain aspects of the present disclosure. In this example, the PUSCH transmission 502 may be allocated a transmit power of $P_1$ in the transmission occasions 506, and the PUCCH transmission 504 may be allocated a transmit power of $P_2$ in the transmission occasions 506, such that the total of $P_1$ and $P_2$ is smaller than or equal to the transmit power threshold ($P_{CMAX}$). As the PUCCH transmission 504 may carry a HARQ-ACK, the PUSCH transmission 502 without a HARQ-ACK or CSI may have a lower priority than the PUCCH transmission 504. In such a case, the PUSCH transmission 502 may be allocated a lower transmit power than the PUCCH transmission 504 in the transmission occasions 506.

For DMRS bundling in a first transmission (e.g., on a first component carrier) and in case of collision with a higher priority second transmission (e.g., on a second component carrier), the UE may adjust the transmit power of the first transmission to ensure the total transmit power does not exceed the maximum transmit power supported by the UE. A transmit power reduction in the first transmission may eliminate the coherency of the DMRS bundling. In such a case, the prioritizations for transmission power reductions may not facilitate a consistent power for DMRS bundling and/or joint channel estimation.

Example Power Consistency for Uplink DMRS Bundling

Aspects of the present disclosure provide various techniques and apparatus for providing transmit power consistency for transmissions with DMRS bundling. In certain cases, the prioritizations for transmission power reductions may take into account a transmission with DMRS bundling and allocate a consistent transmit power across at least a portion of the transmission with DMRS bundling. For example, the prioritizations for transmission power reductions may provide conflict resolution for a transmission with DMRS bundling through a separate rank for DMRS bundling in the priority order (e.g., the NR priority order), cancellation of a portion of a colliding transmission (such as a lower priority transmission), or separating DMRS bundling along the overlapping transmission occasion. In aspects, the prioritizations for transmission power reductions may provide conflict resolution that is a function of a priority index, a DMRS bundling flag, and the payload type. In general, the UE may prioritize the earlier started transmission with DMRS bundling when the overlapping transmissions have the same priority; otherwise, the UE may prioritize the higher-priority transmission but take into account the transmission with DMRS bundling (such as cancellation or fallback to the non-coherent transmission in the overlapping transmission occasions).

The prioritizations for transmission power reductions that take into account DMRS bundling described herein may enable allocation of a transmit power to a transmission with DMRS bundling that provides desirable channel estimation at the receiver (e.g., a base station) and/or desirable coverage. As such, the prioritizations for transmission power reductions may facilitate desirable uplink transmission performance, such as desirable data rates, latency, and/or coverage.

FIG. 6 is a flow diagram illustrating example operations 600 for wireless communication, in accordance with certain aspects of the present disclosure. The operations 600 may be performed, for example, by a UE (such as the UE 120a in the wireless communication network 100). The operations 600 may be implemented as software components that are executed and run on one or more processors (e.g., controller/processor 280 of FIG. 2). Further, the transmission and reception of signals by the UE in the operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 602, where the UE may identify that a first uplink transmission having DMRS bundling overlaps in time with a second uplink transmission in one or more transmission occasions (e.g., time-domain resources). The first uplink transmission may overlap in the time-domain with the second uplink transmission, for example, as described herein with respect to FIG. 5. In aspects, the second uplink transmission may be a transmission with or without DMRS bundling. As used herein, a transmission occasion may refer to one or more time-domain resource units, such as a symbol, mini-slot, or slot, for example, as described herein with respect to FIG. 3. A mini-slot may refer to a contiguous sequence of symbols in a slot, such as two or four consecutive symbols in a slot.

At block 604, the UE may allocate, in response to the identification at block 602, a transmit power among the first uplink transmission and the second uplink transmission at the one or more transmission occasions based on the first uplink transmission having the DMRS bundling. For example, at block 604, the UE may apply various prioritizations for transmission power reductions that take into account that the first uplink transmission has DMRS bundling, such as a separate rank for DMRS bundling in the priority order (e.g., the NR priority order), cancellation of a portion of a colliding transmission (such as a lower priority transmission), or separating DMRS bundling along the overlapping transmission occasion, as further described herein.

At block 606, the UE may transmit at least one of the first uplink transmission or the second uplink transmission in the one or more transmission occasions at the allocated transmit power. For example, the UE may transmit the first uplink transmission with DMRS bundling in transmission occasions that do not overlap with the second uplink transmission and fallback to a non-coherent transmission in the transmission occasions that overlap with the second uplink transmission. At block 606, the UE may be communicating with a base station (such as, the BS 110a depicted in FIG. 1). That is, the UE may transmit the first uplink transmission or the second uplink transmission to the base station.

In certain aspects, the prioritizations for transmission power reductions may cancel a portion of a lower priority transmission. For example, if a coherent PUSCH/PUCCH transmission with DMRS bundling overlaps with a higher priority transmission (e.g., a URLLC transmission with priority index 1 or HARQ-ACK/CSI with same priority index) and a total transmit power exceeds a threshold transmit power, the a portion of the low-priority transmission may be cancelled. In certain cases, only the overlapping transmission occasions may be canceled. In such cases, power consistency (i.e., DMRS bundling) can be assumed after cancellation for joint channel estimation across all the transmission occasions excluding the overlapping transmission occasions. In certain aspects, the overlapping and subsequent transmission occasions may be canceled.

At block 604, if the first uplink transmission has a lower priority than the second uplink transmission in a priority order (e.g., the NR priority order) associated with the first uplink transmission and the second uplink transmission, the UE may cancel at least one transmission occasion of the first uplink transmission if a total transmit power for the first uplink transmission and the second uplink transmission will exceed a transmit power threshold (e.g., $\dot{P}_{CMAX}(i)$). The cancellation of a transmission occasion may involve the UE refraining from transmitting on the carrier associated with the first uplink transmission.

As an example, the first uplink transmission may have a lower priority than the second uplink transmission, if the first uplink transmission is a PUSCH transmission without HARQ-ACK information, and the second uplink transmission is a PUSCH/PUCCH transmission with HARQ-ACK information. As another example, the first uplink transmission may have a lower priority than the second uplink transmission, if the first uplink transmission is a PUCCH/PUSCH transmission with a lower priority index (e.g., a priority index of 0), and the second uplink transmission is a PUCCH/PUSCH transmission with a higher priority index (e.g., a priority index of 1).

In aspects, the canceled transmission occasions of the first uplink transmission may include the transmission occasions that overlap in time with the second uplink transmission and/or subsequent transmission occasions, which follow the overlapping transmission occasions. As used herein, the overlapping transmission occasions refer to the transmission occasions where the first uplink transmission overlaps in time with the second uplink transmission (such as the transmission occasions 506). With respect to the operations 600, the at least one transmission occasion (i.e., the canceled transmission occasions associated with the first uplink transmission) may include the one or more transmission occasions where the first uplink transmission overlaps in time with the second uplink transmission. The at least one transmission occasion (i.e., the canceled transmission occasions) may further include one or more subsequent transmission occasions after the one or more transmission occasions where the first uplink transmission overlaps in time with the second uplink transmission.

In the case where only the overlapping transmission occasions are canceled from the first uplink transmission, the power consistency may be assumed for the non-canceled transmission occasions associated with the first uplink transmission, including the transmission occasions after the cancellation. That is, the UE may maintain DMRS bundling across the non-consecutive transmission occasions, for example, as further described herein with respect to FIG. 7A. At block 606, the UE may allocate a consistent transmit power to the first uplink transmission across non-canceled transmission occasions associated with the first uplink transmission, where the non-canceled transmission occasions include the transmission occasions before and after the canceled transmissions. In the case where the overlapping and subsequent transmission occasions are canceled, the power consistency may be assumed for the transmission occasions before the cancellation, for example, as further described herein with respect to FIG. 7B.

In certain aspects, the prioritizations for transmission power reductions may temporarily fall back to a non-coherent transmission (i.e., a transmission without DMRS bundling) for a portion of the DMRS bundled transmission or separate the DMRS bundling. These options (e.g., falling back to a non-coherent transmission or DMRS bundling separation) may be applied regardless of whether the total transmit power of the first uplink transmission and second uplink transmission will exceed a transmit power threshold. In other words, these options may be applied if the UE identifies that a transmission with DMRS bundling overlaps in time with another transmission.

As an example, if a coherent PUSCH/PUCCH transmission with DMRS bundling overlaps with a higher priority transmission (e.g., an URLLC transmission with priority index 1 or HARQ-ACK/CSI with same priority index), a fallback to a non-coherent transmission may be assumed for the overlapping transmission occasions, and the transmission occasions before and after the overlapping transmission occasions may be coherent. In aspects, the overlapping transmission occasions and subsequent transmission occasions may be coherent with less transmit power allocated than the previous slots. In certain cases, separating DMRS bundling along the overlapping transmission occasions may be supported, and separating DMRS bundling between the transmission occasions before and after the overlapping transmission occasions may be supported. Even if the same transmit power is used for the transmission occasions before and after the overlapping transmission occasions, the phase may not be continuous across these transmission occasions. In such a case, the DMRS may be assumed to be bundled within each set of transmission occasions (e.g., the transmission occasions before the overlapping transmission occasions, the overlapping transmission occasions, or the transmission occasions after the overlapping transmission occasions) but not across the sets. For example, a higher transmit power (e.g. using the same transmit power as before the collision) can be used for the subsequent transmission occasions to enable desirable performance. The fallback to a non-coherent transmission can be transparent to the network-side (e.g., base station and/or network controller). In other words, no matter whether actual total transmit power exceeds $P_{cmax}$ or not, the base station may assume there is no coherence across the overlapping transmission occasions. The UE may not dynamically report whether coherency is maintained or not for a current slot At block 604, if the first uplink transmission has a lower priority than the second uplink transmission in the priority order (e.g., the NR priority order), the UE may allocate a first transmit power to the first uplink transmission in one or more first transmission occasions occurring before the second uplink transmission and allocate a second transmit power to the first uplink transmission in one or more second transmission occasions where the first uplink transmission overlaps in time with the second uplink transmission, where the second transmit power is the same as (i.e., equal to) or less than (i.e., smaller than) the first transmit power. In other words, the transmit power for the first uplink transmission may or may not be reduced in the overlapping transmission occasions. For certain aspects, the base station may assume that there is no coherency (i.e., no DMRS bundling) across the overlapping transmission occasions.

Figure 8A:
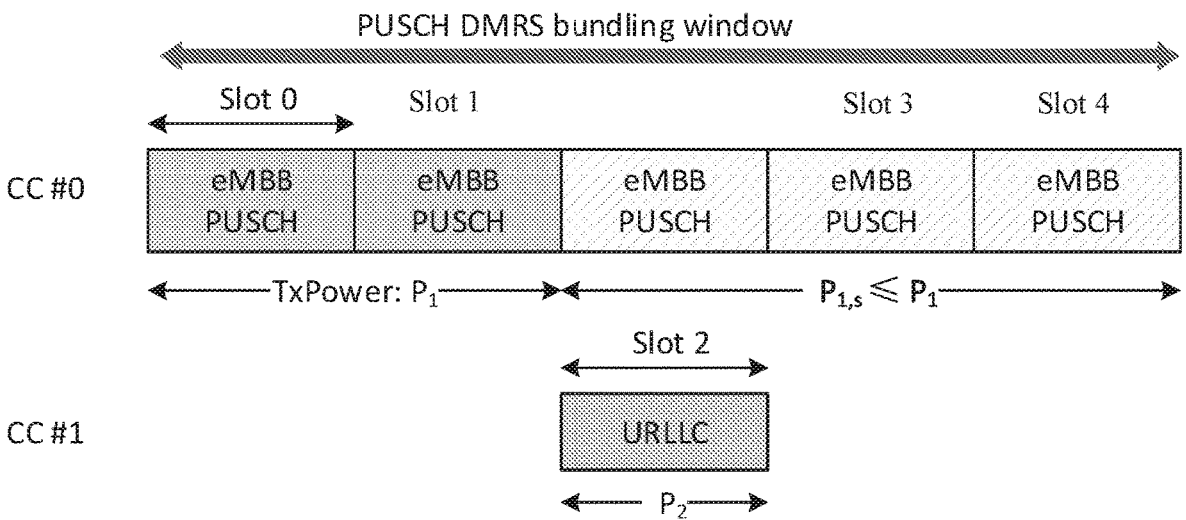
FIG. 8A is a diagram illustrating an example of separating the DMRS bundling at the overlapping transmission occasion, in accordance with certain aspects of the present disclosure.
Figure 8B:
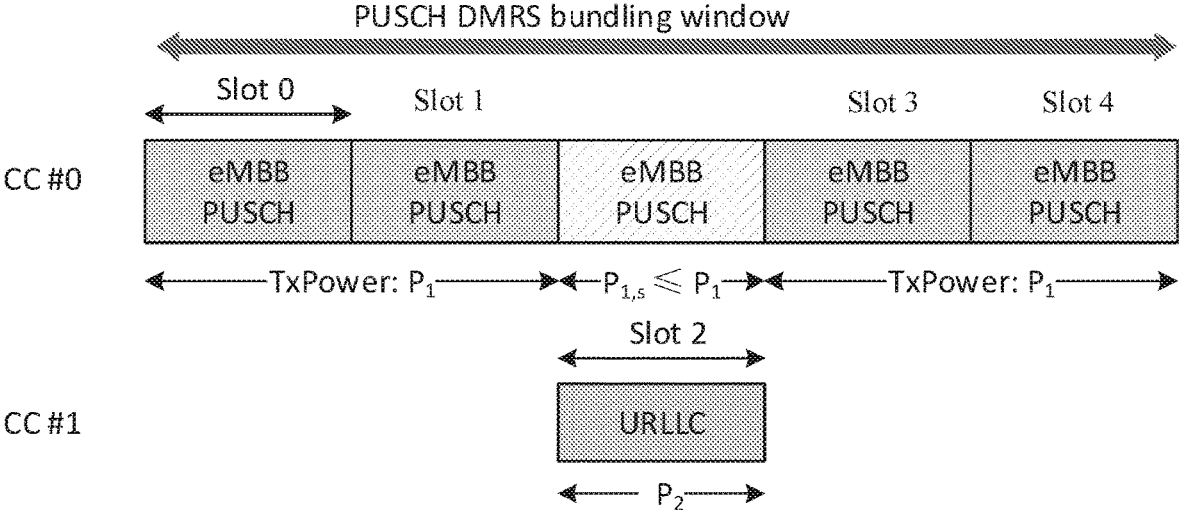
FIG. 8B is a diagram illustrating an example of separating DMRS bundling between the overlapping transmission occasion, in accordance with certain aspects of the present disclosure.

In certain aspects, if the DMRS bundled transmission has a lower priority in the priority order (e.g., the NR priority order), the UE may separate the DMRS bundling into separate coherent segments across the transmission occasions, for example, as further described herein with respect to FIGS. 8A and 8B. At block 604, the UE may allocate the second transmit power to the first uplink transmission in one or more third transmission occasions (i.e., the subsequent transmission occasions) after the one or more second transmission occasions (i.e., the overlapping transmission occasions) such that the DMRS of the first uplink transmission is assumed to be bundled in the one or more first transmission occasions at the first transmit power and bundled in the one or more second transmission occasions and the one or more third transmission occasions at the second transmit power. That is, the first uplink transmission may have DMRS bundling separated into at least two segments, a first segment including the one or more first transmission occasions and a second segment including the one or more second transmission occasions and the one or more third transmission occasions.

For certain aspects, separating the DMRS bundling at block 604 may include allocating a third transmit power to the first uplink transmission in one or more third transmission occasions after the one or more second transmission occasions. In certain cases, the third transmit power may be the same as, smaller than, or larger than the first transmit power. In aspects, the DMRS of the first uplink transmission may be assumed to be bundled in the one or more first transmission occasions at the first transmit power, bundled in the one or more second transmission occasions at the second transmit power, and bundled in the one or more third transmission occasions at the third transmit power.

In certain aspects, if the DMRS bundled transmission has a lower priority in the priority order (e.g., the NR priority order), the UE may fall back to a non-coherent transmission at the overlapping transmission occasions, and the UE may perform DMRS bundling for the transmission occasions before and after the overlapping transmission occasions, for example, as further described herein with respect to FIG. 8B. That is, the overlapping transmission occasions may not be coherent but the transmission before and after the overlapping transmission occasions may be coherent. At block 604, the UE may allocate the first transmit power to the first uplink transmission in one or more third transmission occasions after the one or more second transmission occasions such that the DMRS of the first uplink transmission is assumed to be bundled in the one or more first transmission occasions and the one or more third transmission occasions and not bundled in the one or more second transmission occasions.

Figure 9A:
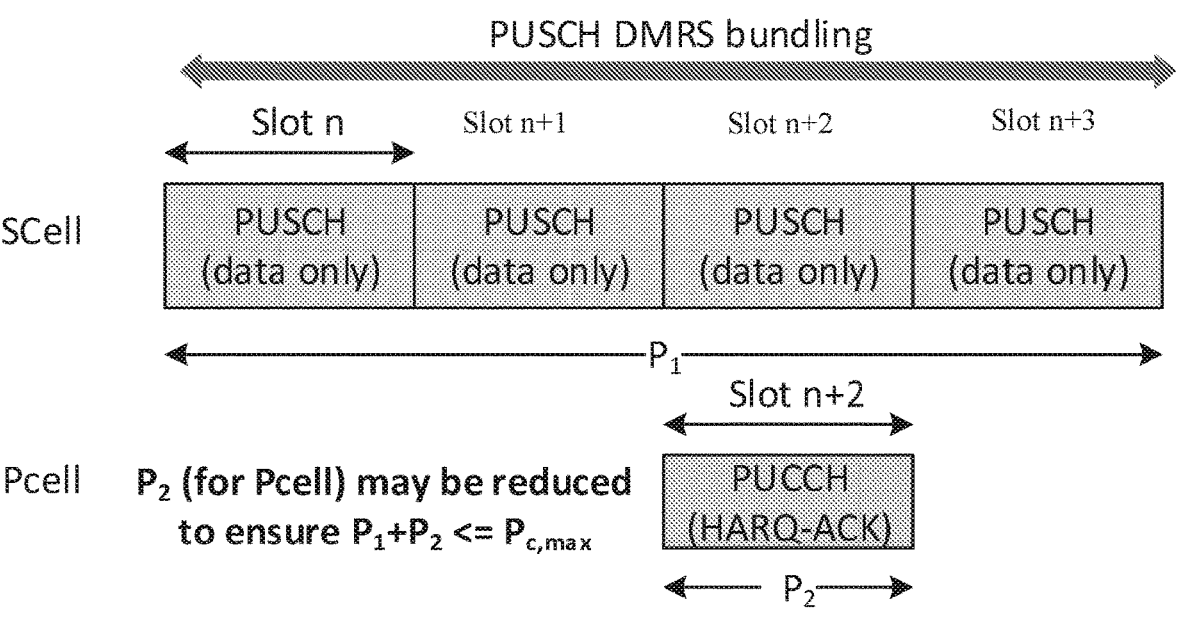
FIG. 9A is a diagram illustrating an example of prioritizing an earlier transmission with DMRS bundling over another transmission, in accordance with certain aspects of the present disclosure.
Figure 9B:
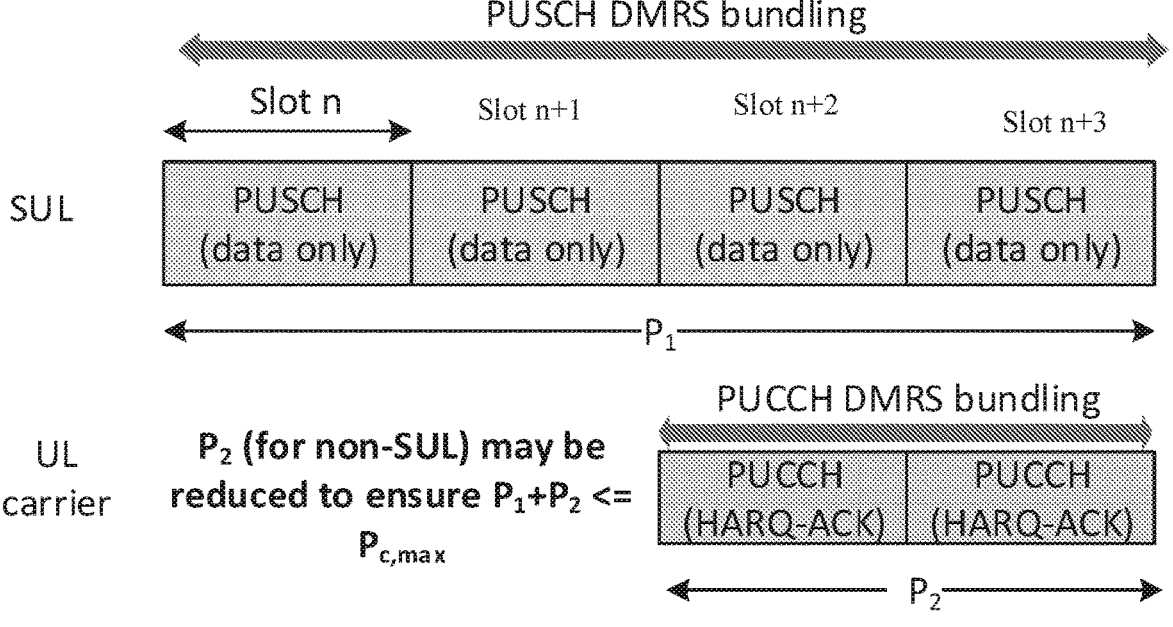
FIG. 9B is a diagram illustrating an example of prioritizing an earlier transmission with DMRS bundling over another transmission with DRMS bundling, in accordance with certain aspects of the present disclosure.

In certain aspects, the prioritizations for transmission power reductions may prioritize an earlier transmission with DMRS bundling, if the overlapping transmissions have the same priority in the priority order (e.g., same order/rank and/or same priority index), for example, as further described herein with respect to FIGS. 9A and 9B. As an example, if a coherent PUSCH/PUCCH transmission with DMRS bundling overlaps with a second PUCCH/PUSCH transmission with the same priority order, the earlier transmission with DMRS bundling may be assumed to have a higher priority for transmit power allocation regardless of the carrier index (e.g. the transmission with DMRS bundling on the Scell may be prioritized over the transmission on the Pcell, or the transmission on a supplementary UL carrier may be prioritized over the non-supplementary UL carrier). A UE may prioritize transmit power allocation for an earlier coherent transmission over a later transmission. This assumption of priority for earlier transmission with DMRS bundling may also apply to overlapping transmissions with the same priority index. That is, the UE may the transmit power allocation for an earlier coherent transmission regardless of content of the latter transmission.

With respect to the operations 600, the first uplink transmission may take priority over the second uplink transmission in the priority order, if the first uplink transmission starts earlier than the second uplink transmission, and if the first uplink transmission and the second uplink transmission have a same order in the priority order. At block 604, the UE may allocate the transmit power among the first uplink transmission and the second uplink transmission based on the first uplink transmission taking priority over the second uplink transmission. For example, the UE may allocate a transmit power to the first uplink transmission that maintains the DMRS bundling for the entire duration of the first uplink transmission.

The same order in the priority order (e.g., the NR priority order) may refer to one of the overlapping transmissions having a certain order/rank in the priority order and the other overlapping transmission having that same order/rank. For example, the overlapping transmissions may have the same order if the overlapping transmissions are PUSCH transmissions with HARQ-ACK information.

In certain aspects, the earlier DMRS bundled transmission may take priority in the priority order (e.g., the NR priority order), also if the overlapping transmissions have the same priority index. With respect to the operations 600, the first uplink transmission may take priority over the second uplink transmission in the priority order, also if the first uplink transmission and the second uplink transmission have a same priority index. In certain aspects, the earlier DMRS bundled transmission may take priority in the priority order, also if the other overlapping transmission has DMRS bundling. With respect to the operations 600, the first uplink transmission may take priority over the second uplink transmission in the priority order, also if the second uplink transmission has DMRS bundling.

With respect to an earlier DMRS bundled transmission taking priority, at block 604, the UE may allocate a first transmit power to the first uplink transmission based on the first uplink transmission taking priority over the second uplink transmission. In certain aspects, the first transmit power may be constant or consistent for an entire duration of the first uplink transmission. At block 604, the UE may allocate a second transmit power to the second uplink transmission such that a total of the first transmit power and the second transmit power is smaller than or equal to the transmit power threshold in the one or more transmission occasions. In certain cases, a constant or consistent transmit power may have a nominal value with minor variations (e.g., ±5% from the nominal value), for example, due to dynamic operating conditions/characteristics associated with the transmitter of the UE. In certain cases, the constant or consistent transmit power may be applied in the context of beamforming. For example, the constant or consistent transmit power may involve using a set of transmit power weights (which may have separate or varying weighting values) across an antenna array consistently for the duration of the DMRS bundled transmission occasions. That is, the same set of transmit power weights (which may vary among the antenna elements of the antenna array) may be used for the duration of the DMRS bundled transmission occasions.

In certain aspects, the prioritizations for transmission power reductions may be based on timeline conditions. For example, the prioritizations for transmission power reductions may apply the various prioritization schemes associated with DMRS bundling (e.g., cancellation of overlapping transmission occasions, non-coherent fallback, or prioritizing an earlier DMRS bundled transmission) if an earlier transmission starts before a certain time window (e.g., $T_{proc,d}$+d or $T_{proc,CSI}$+d) after receiving scheduling for another transmission. In certain cases, prioritizations for transmission power reductions may allocate transmit powers according to the priority order (e.g., the NR priority order) associated with the overlapping transmissions if an earlier transmission does not start before the time window (e.g., $T_{proc,d}$+d or $T_{proc,CSI}$+d) after receiving scheduling for another transmission.

As an example, if the earliest symbol of a transmission with DMRS bundling starts no earlier than a certain time window (e.g., $T_{proc}$+d) after a last symbol of the DCI scheduling for another transmission, the UE may prioritize the transmit power allocation according to the priority order associated with the overlapping transmissions. For example, the higher priority transmission may be allocated more transmit power than the lower priority transmission, and the transmission with DMRS bundling may apply that allocated transmit power for the duration of DMRS bundled transmission occasions. If the earliest symbol of a transmission with DMRS bundling starts earlier than a certain time window (e.g., $T_{proc}$+d) after a last symbol of the DCI scheduling for another transmission, the UE may apply the various prioritization schemes described herein (e.g., cancellation of overlapping transmission occasions, non-coherent fallback, or prioritizing an earlier DMRS bundled transmission).

With respect to the operations 600, the UE may receive information (e.g., DCI, radio resource control (RRC) signaling, medium access control (MAC) signaling, or system information) scheduling the second uplink transmission. At block 604, the UE may allocate the transmit power according to a priority order (e.g., the NR priority order) associated with the first uplink transmission and the second uplink transmission if the first uplink transmission (e.g., a first symbol in the first uplink transmission) does not start before a time window after the reception of the information (e.g., after a last symbol of the DCI or PDCCH carrying the DCI). The UE may allocate a first transmit power to the first uplink transmission and a second transmit power to the second uplink transmission according to the priority order. In certain aspects, the first transmit power may be constant for an entire duration of the first uplink transmission.

With respect to the operations 600, the UE may receive information scheduling the second uplink transmission. The UE may allocate the transmit power the based on the first uplink transmission starting before a time window after the reception of the information. For example, the UE may allocate the transmit power according the various prioritization schemes associated with DMRS bundling described herein, such as cancellation of overlapping transmission occasions, non-coherent fallback, or prioritizing an earlier DMRS bundled transmission. That is, the various prioritization schemes associated with DMRS bundling described herein may apply to cases when the UE cannot react in time to determine an appropriate transmit power for the subsequent overlapping transmission.

In aspects, the time window may have a duration based on various preparation times or computation times associated with the UE's processing capabilities. In certain cases, the time window may have a duration based on a PUSCH or PUCCH preparation time (e.g., $T_{proc,d}$) according to a minimum UE processing capability. The time window may have a duration based on CSI computation time (e.g., $T_{proc,CSI}$) according to a minimum CSI computation delay. For example, the time window may have a duration according to the following expression:

$$T_{proc} + d$$

where $T_{proc}$ may include a PUSCH/PUCCH preparation time (e.g., $T_{proc,d}$) or a CSI computation time (e.g., $T_{proc,CSI}$), and d may be a UE capability (e.g., $d \in \{0,1,2\}$), which is reported to the network. In certain aspects, $T_{proc}$ may include a PUSCH preparation time $T_{proc,d}$ (such as $T_{proc,2}$, which is based on a transmission numerology p and N 2 symbols of minimum processing capability 2) for a PUSCH transmission as the latter transmission or a CSI computation delay $T_{proc,CSI}$ (such as the CSI computation delay requirement 1) for a PUCCH transmission as the latter transmission. In certain aspects, $T_{proc,d}$ may be based on a value of μ corresponding to the smallest subcarrier spacing (SCS) configuration among the overlapping transmissions. For example, $T_{proc,d}$ may default to 10 symbols for μ=0, 12 symbols for μ=1, 23 symbols for μ=2, and 36 symbols for μ=3.

In aspects, DMRS bundling may involve transmitting the DMRSs in a transmission with phase continuity (i.e., a coherent phase) and a constant or consistent transmit power. With respect to the operations 600, at block 606, the UE may transmit the first uplink transmission over multiple slots or mini-slots with phase continuity and a consistent transmit power.

For certain aspects, the first and second uplink transmission may be on separate carriers (e.g., component carriers for operation with carrier aggregation or a single cell with two uplink carriers). As an example for operation with carrier aggregation, the first uplink transmission may be transmitted via a first component carrier associated with a Pcell, and the second uplink transmission may be transmitted via second component carrier associated with a Scell. In certain cases, for single cell operation with two uplink carriers (e.g., supplementary uplink carrier and non-supplementary uplink carrier), the first uplink transmission may be transmitted on the supplementary uplink carrier, and the second uplink transmission may be transmitted on the non-supplementary uplink carrier. In other words, the UE may transmit the first uplink transmission via a first carrier and the second uplink transmission via a second carrier.

In certain aspects, the overlapping transmissions may be various transmission types. For example, the first uplink transmission or the second uplink transmission may include at least one of a PUSCH transmission, a PUCCH transmission, a PRACH transmission, or a SRS transmission.

In aspects, the priority order may be a priority hierarchy of transmission types, such as a PRACH transmission, PUCCH transmission, PUSCH transmission, and/or SRS transmission. For PUCCH and PUSCH transmissions, the priority order may have ranks associated with the payload type (e.g., with or without HARQ-ACK information, SR, LRR, or CSI) of the transmission. The priority order may be the NR priority order described herein, for example. The priority order may include a separate rank or order associated with a PUCCH/PUSCH transmission with DMRS bundling. For example, the NR priority order described herein may further include a separate rank for PUCCH/PUSCH transmissions with the same priority index, where the separate rank is associated with a transmission with DRMS bundling. In aspects, the priority hierarchy of transmission types may include a rank associated with a priority index and a payload type associated with the first uplink transmission and the second uplink transmission.

Figures 7A, 7B:
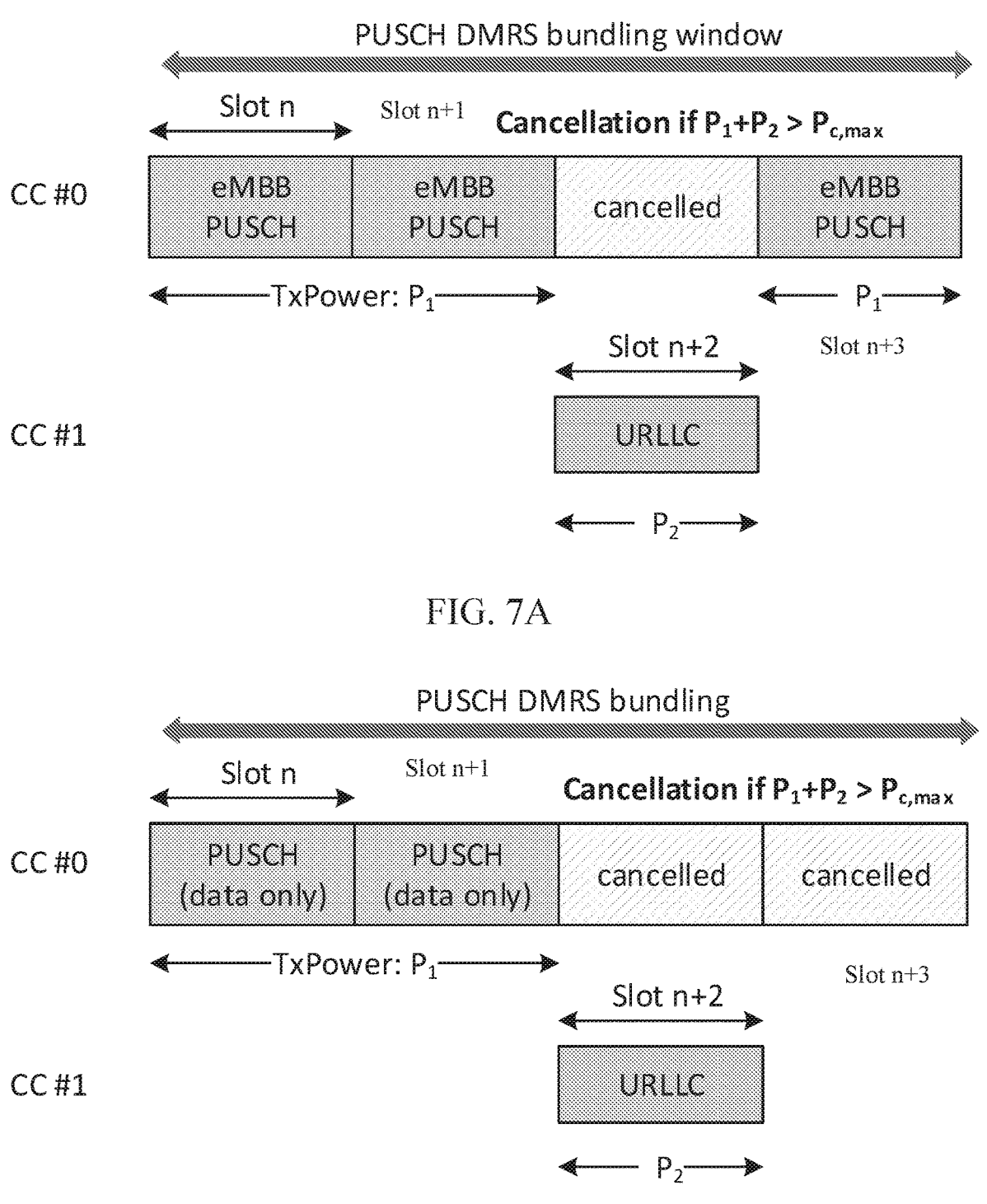
FIG. 7A is a diagram illustrating an example of canceling an overlapping transmission occasion of a lower priority transmission with DMRS bundling, in accordance with certain aspects of the present disclosure.
FIG. 7B is a diagram illustrating an example of cancelling the overlapping transmission occasion and subsequent transmission occasions of a lower priority transmission with DMRS bundling, in accordance with certain aspects of the present disclosure.

FIG. 7A is a diagram illustrating an example of canceling an overlapping transmission occasion of a lower priority transmission with DMRS bundling, in accordance with certain aspects of the present disclosure. In this example, a first transmission with DMRS bundling (e.g., a PUSCH transmission with DMRS bundling) is scheduled across four slots (Slot n through Slot n+3) on a first component carrier (CC #0). A higher priority second transmission (e.g., an URLLC-PUSCH transmission with a priority index of 1) on a second component carrier (CC #1) is scheduled in Slot n+2. The UE may identify that the first transmission overlaps in time with the second transmission in Slot n+2 and that the total transmit power of the first and second transmissions in Slot n+2 exceeds a threshold transmit power (e.g., $\hat{P}_{CMAX}(i)$). As the UE may have allocated a transmit power $P_1$ to the first transmission, the UE may cancel a portion of the first transmission in the overlapping transmission occasions (e.g., in Slot n+2) in response to the identification. The first transmission may have a consistent transmit power across the non-canceled transmission occasions. For example, the UE may allocate the same transmit power $P_1$ in slots n, n+1, and n+3. The cancellation of the first transmission in Slot n+2 may enable the UE to allocate a transmit power $P_2$ to the second transmission in Slot n+2, where the total of $P_1$ and $P_2$ would exceed the threshold transmit power.

FIG. 7B is a diagram illustrating an example of cancelling the overlapping transmission occasion and subsequent transmission occasions of a lower priority transmission with DMRS bundling, in accordance with certain aspects of the present disclosure. In certain cases, the UE may also cancel the subsequent transmission occasions following the overlapping transmission occasions. For example, the UE may cancel the portion of the first transmission in Slots n+2 and n+3, if the higher priority second transmission overlaps in time with the first transmission and the total transmit power will exceed the threshold transmit power.

FIG. 8A is a diagram illustrating an example of separating the DMRS bundling at the overlapping transmission occasion, in accordance with certain aspects of the present disclosure. In this example, the first transmission with DMRS bundling (e.g., a PUSCH transmission with DMRS bundling) may be scheduled across five slots (Slot 0 through Slot 4) on the first component carrier (CC #0). The higher priority second transmission may also be scheduled on the second component carrier (CC #1) in Slot 2. The UE may identify that the first transmission overlaps in time with the second transmission in Slot 2. In response to this identification, the UE may determine which portion of the first transmission will have DMRS bundling as further described herein.

As an example, the UE may allocate to the first transmission a transmit power ($P_{1,s}$) in the overlapping slot (Slot 2) and the subsequent slots (Slots 3 and 4), where $P_{1,s}$ may be less than or equal to $P_1$. The UE may also allocate a transmit power $P_2$ to the second transmission in Slot 2. In aspects, the total of $P_{1,s}$ and $P_2$ may be smaller than or equal to the transmit power threshold.

Referring to FIG. 8A, the first transmission may have DMRS bundling in the slots (Slots 0 and 1) before the overlapping slot at a transmit power $P_1$. The first transmission may have separate DMRS bundling across slots 0 and 1 and slots 2-4 at different transmit powers (e.g., $P_1$ and $P_{1,s}$). That is, the first transmission may have DMRS bundling in the slots (Slots 0 and 1) before the overlapping slot at the transmit power $P_1$, and the first transmission may have DMRS bundling in in the overlapping slot (Slot 2) and the subsequent slots (Slots 3 and 4) at the transmit power $P_{1,s}$.

FIG. 8B is a diagram illustrating an example of separating DMRS bundling between the overlapping transmission occasion, in accordance with certain aspects of the present disclosure. In this example, the first transmission may separate DMRS bundling in the slots (Slots 0 and 1) before the overlapping slot at the transmit power $P_1$, in the overlapping slots (Slot 2) at the transmit power $P_1$,s, and in the slots (Slots 3 and 4) after the overlapping slots at the transmit power $P_1$. In certain aspects, the first transmission may fall back to a non-coherent transmission only in the overlapping slot. That is, there may be separate DMRS bundling in the slots before and after the overlapping slot, and a non-coherent transmission in the overlapping slot(s). In certain aspects, separating the DMRS bundling can also be applied for transmission interruption by an uplink cancellation indication. That is, the UE may receive, from a network entity (e.g., a base station or network controller), an indication that cancels a portion of a transmission with DMRS bundling. For example, the indication may cancel an intermediate portion of the transmission in the time-domain, and the UE may perform DMRS bundling for non-consecutive transmission occasions. That is, the cancellation may be confined to a portion of the transmission between transmission occasions associated with the transmission, such that all the remaining transmission occasions, which follow the canceled transmission occasions, still continue with DMRS bundling.

Those of skill in the art will understand that the segments of the first transmission, which are described as being coherent (DMRS bundled) or non-coherent, illustrated in FIGS. 8A and 8B are exemplary only. Aspects of the present disclosure may also apply to separating the DMRS bundled transmission into various DMRS bundled and/or non-coherent segments in cases where the DMRS bundled transmission has a lower priority than the other overlapping transmission.

FIG. 9A is a diagram illustrating an example of prioritizing an earlier transmission with DMRS bundling over another transmission, in accordance with certain aspects of the present disclosure. In this example, the first transmission with DMRS bundling (e.g., a PUSCH transmission with DMRS bundling) may be scheduled across four slots (Slot n through Slot n+3) on the first component carrier to a Scell. The second transmission may also be scheduled on the second component carrier in Slot n+2 to a Pcell. The first and second transmissions may have the same priority in a priority order (e.g., the NR priority order). The UE may identify that the first transmission overlaps in time with the second transmission in Slot n+2. In response to this identification, the UE may prioritize the first transmission based on the first transmission starting before the second transmission instead of the transmission on the Pcell. Such a prioritization order is different from the priority handling as described herein with respect to the NR priority order that is based on the carrier index when two transmissions have the same priority. Prioritizing the earlier DMRS bundled transmission may enable desirable uplink performance for the earlier transmission, such as desirable data rates, latency, and/or coverage. For example, the UE may allocate a consistent transmit power $P_1$ to the first transmission across Slot n through Slot n+3, such that the transmit power $P_1$ ensures DMRS bundling across Slot n through Slot n+3. The UE may allocate a transmit power $P_2$ to the second transmission such that the total of $P_1$ and $P_2$ is smaller than or equal to the transmit power threshold. In certain aspects, $P_2$ may be smaller than or equal to the $P_1$.

FIG. 9B is a diagram illustrating an example of prioritizing an earlier transmission with DMRS bundling over another transmission with DRMS bundling, in accordance with certain aspects of the present disclosure. In this example, the first and second transmissions may be transmitted on separate carriers of a single cell, and the second transmission may have DMRS bundling in Slot n+2 and Slot n+3. The first transmission may be on a supplementary uplink (SUL) carrier, and the second transmission may be on a non-supplementary uplink carrier. If the first and second transmissions have the same priority, the UE may prioritize the first transmission based on the first transmission starting before the second transmission instead of the transmission on the non-supplementary uplink carrier. In aspects, the first transmission may have DMRS bundling at a transmit power $P_1$, and the second transmission may have DMRS bundling at a transmit power $P_2$, such that the total of $P_1$ and $P_2$ is smaller than or equal to the transmit power threshold. In certain aspects, $P_2$ may be smaller than or equal to the $P_1$.

Figure 10A:
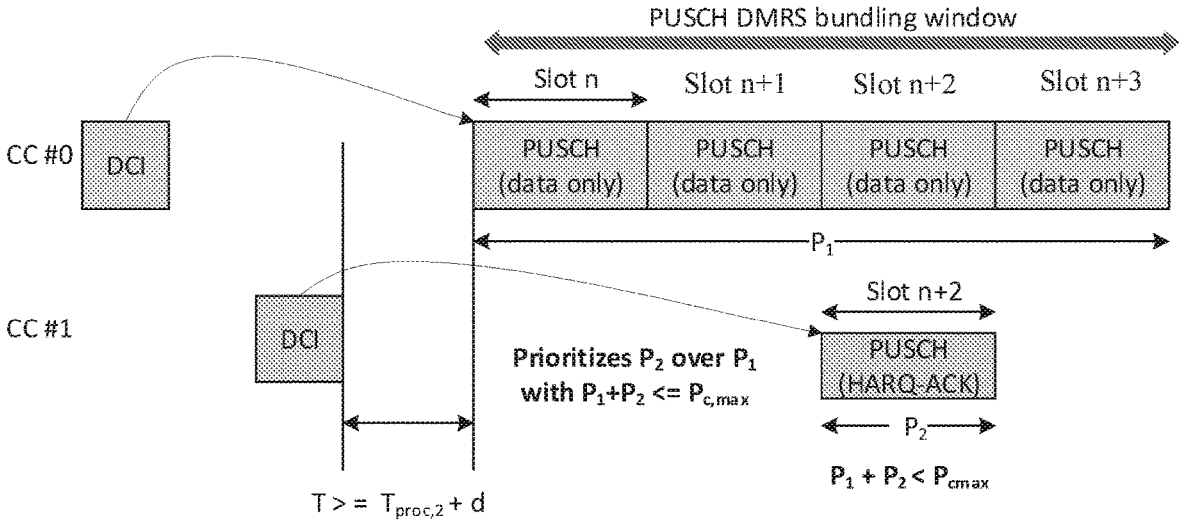
FIG. 10A is a diagram illustrating an example of allocating a transmit power in accordance with a priority order based on an earlier transmission not starting before a certain time window, in accordance with certain aspects of the present disclosure.

FIG. 10A is a diagram illustrating an example of allocating a transmit power in accordance with a priority order based on an earlier transmission not starting before a certain time window, in accordance with certain aspects of the present disclosure. In this example, a UE may receive first DCI on the first component carrier, where the first DCI schedules the first transmission with DMRS bundling across four slots (Slot n through Slot n+3). The UE may also receive second DCI on the second component, where the second DCI schedules the second transmission on the second component carrier in Slot n+2. If the first transmission is scheduled to not start before the time window (e.g., $T_{proc,2}$+d or $T_{proc,CSI}$+d) after reception of the second DCI (e.g., after a last symbol of the second DCI or PDCCH carrying the second DCI), the UE may prioritize the allocation of transmit power according to a priority order (e.g., the NR priority order) associated with the first and second transmissions. In this example, the duration between the last symbol of the second DCI and the first symbol of the first transmission may be greater than the time window, such that the UE applies the transmit prioritization based on the priority order associated with the first and second transmissions. Suppose the first transmission has a lower priority than the second transmission, the UE may allocate a transmit power $P_1$ to the first transmission across Slot n through Slot n+3 and a transmit power $P_2$ to the second transmission, such that the total of $P_1$ and $P_2$ is smaller than or equal to the transmit power threshold, and $P_1$ may be smaller than or equal to the $P_2$.

Figure 10B:
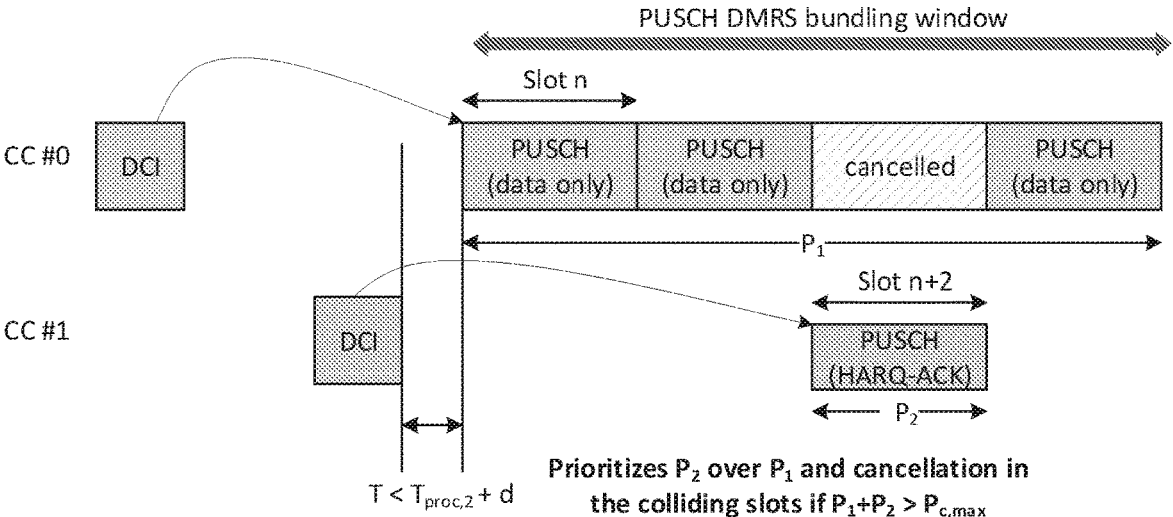
FIG. 10B is a diagram illustrating an example of cancelling a transmission occasion of a transmission with DMRS bundling based on an earlier transmission starting before a certain time window, in accordance with certain aspects of the present disclosure.

FIG. 10B is a diagram illustrating an example of cancelling a transmission occasion of a transmission with DMRS bundling based on an earlier transmission starting before a certain time window, in accordance with certain aspects of the present disclosure. In this example, the duration between the last symbol of the second DCI and the first symbol of the first transmission may be less than the time window (e.g., $T_{proc,2}$+d or $T_{proc,CSI}$+d). If the first transmission is scheduled to start before the time window (e.g., $T_{proc,2}$+d or $T_{proc,CSI}$+d) after reception of the second DCI (e.g., after a last symbol of the second DCI or PDCCH carrying the second DCI), the UE may apply the various schemes of prioritizations for transmission power reductions described herein, for example, with respect to FIGS. 7A-9B. In this example, the UE may cancel the overlapping portion of the first transmission, for example, as described herein with respect to FIG. 7A.

While the examples depicted in FIGS. 7A, 7B, 8A, 8B, 9A, 10A, and 10B are described herein with respect to there being a single overlapping slot between the first and second transmissions to facilitate understanding, aspects of the present disclosure may also be applied to the first and second transmissions overlapping across one or more time-domain resources, such as symbols, mini-slots, or slots.

FIG. 11 is a flow diagram illustrating example operations 1100 for wireless communication, in accordance with certain aspects of the present disclosure. The operations 1100 may be performed, for example, by a network entity (such as the BS 110a in the wireless communication network 100). The operations 1100 may be complementary to the operations 600 performed by the UE. The operations 1100 may be implemented as software components that are executed and run on one or more processors (e.g., controller/processor 240 of FIG. 2). Further, the transmission and reception of signals by the network entity in operations 1100 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals. In aspects, a network entity may include a base station and/or a network controller.

The operations 1100 may begin, at block 1102, where the network entity may identify that a first uplink transmission from a UE overlaps in time with a second uplink transmission from the UE in one or more transmission occasions, the first uplink transmission having DMRS bundling.

At block 1104, the network entity may receive a signal associated with the first uplink transmission. For example, the network may receive a PUSCH, PUCCH, or an SRS transmission as the first uplink transmission from the UE.

At block 1106, the network entity may perform a joint channel estimation with the received signal based on the identification. For example, the network entity may estimate a channel associated with the first uplink signal across multiple transmission occasions (e.g., mini-slots or slots). That is, multiple transmission occasions may be used to develop an estimate or model of the channel associated with the first uplink transmission. The channel estimation may enable the network entity to perform equalization and decode the signal into information bits, for example.

In certain aspects, the network entity may be under the assumption that all of the transmission occasions associated with the first uplink transmission have DMRS bundling. That is, the channel estimation performed by the network entity may assume that all of the transmission occasions associated with the first uplink transmission can be used for joint channel estimation. At block 1106, the network entity may perform the joint channel estimation under an assumption that all transmission occasions associated with the first uplink transmission have DMRS bundling.

For certain aspects, the network entity may identify which transmission occasions of the first uplink transmission have DMRS bundling for joint channel estimation if the first uplink transmission has a lower priority than the second uplink transmission. At block 1106, if the first uplink transmission has a lower priority than the second uplink transmission in a priority order associated with the first uplink transmission and the second uplink transmission, the network entity may perform the joint channel estimation under an assumption that one or more first transmission occasions where the first uplink transmission overlaps in time with the second uplink transmission and one or more second transmission occasions after the one or more first transmission occasions have DMRS bundling. In other words, the network entity may assume that the overlapping and subsequent transmission occasions have DMRS bundling for the joint channel estimation.

In aspects, at block 1106, if the first uplink transmission has a lower priority than the second uplink transmission in the priority order, the network entity may perform the joint channel estimation under an assumption that one or more first transmission occasions before one or more second transmission occasions where the first uplink transmission overlaps in time with the second uplink transmission and one or more third transmission occasions after the one or more second transmission occasions have DMRS bundling, and that the one or more second transmission occasions is cancelled. In other words, the network entity may assume that transmission occasions before and after the overlapping transmission occasions have DMRS bundling for the joint channel estimation.

In certain aspects, at block 1106, if the first uplink transmission has a lower priority than the second uplink transmission in the priority order, the network entity may perform the joint channel estimation under an assumption that one or more first transmission occasions before one or more second transmission occasions where the first uplink transmission overlaps in time with the second uplink transmission has DMRS bundling at a first transmit power, and that the one or more second transmission occasions and one or more third transmission occasions after the one or more second transmission occasions have DMRS bundling at a second transmit power. That is, the network entity may assume that the transmission occasions before the overlapping transmission occasions have DMRS bundling at a first transmit power, and that the overlapping and subsequent transmission occasions have DMRS bundling at a second transmit power.

For certain aspects, at block 1106, if the first uplink transmission has a lower priority than the second uplink transmission in the priority order, the network entity may perform the joint channel estimation under an assumption that one or more first transmission occasions before one or more second transmission occasions where the first uplink transmission overlaps in time with the second uplink transmission has DMRS bundling at a first transmit power, that the one or more second transmission occasions has DMRS bundling at a second transmit power, and that one or more third transmission occasions after the one or more second transmission occasions have DMRS bundling at a third transmit power. That is, the network entity may assume that DMRS bundling may be separated into at least three segments, the first transmission occasions, the second transmission occasions, and the third transmission occasions.

For certain aspects, the network entity may perform the joint channel estimation under an assumption that the first uplink transmission is transmitted over multiple slots or mini-slots with phase continuity and a consistent transmit power. While various aspects are described herein with respect to slot-based DMRS bundling (i.e., DMRS bundling/ joint channel estimation across multiple slots), aspects of the present disclosure may also be applied to other levels of DMRS bundling, such as mini-slot based DMRS bundling.

Figure 12:
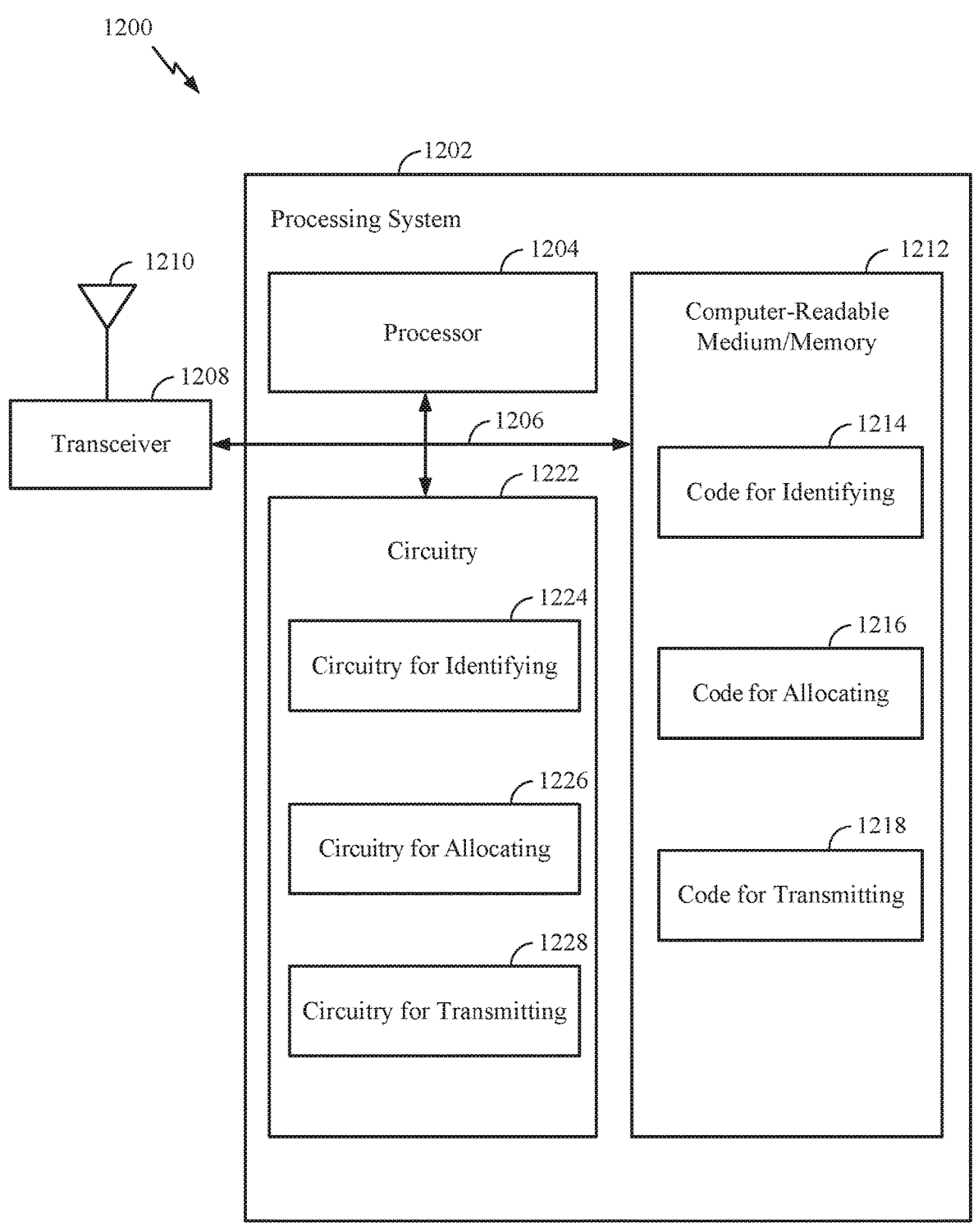
FIG. 12 illustrates a communications device (e.g., a UE) that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 6. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/ memory 1212 is configured to store instructions (e.g., computer-executable code) that when executed by the processor 1204, cause the processor 1204 to perform the operations illustrated in FIG. 6, or other operations for performing the various techniques discussed herein for prioritizations for transmission power. In certain aspects, computer-readable medium/memory 1212 stores code for identifying 1214, code for allocating 1216, and/or code for transmitting. In certain aspects, the processing system 1202 has circuitry 1222 configured to implement the code stored in the computer-readable medium/memory 1212. In certain aspects, the circuitry 1222 is coupled to the processor 1204 and/or the computer-readable medium/memory 1212 via the bus 1206.

For example, the circuitry 1222 includes circuitry for identifying 1224, circuitry for allocating 1226, and/or circuitry for transmitting 1228.

Figure 13:
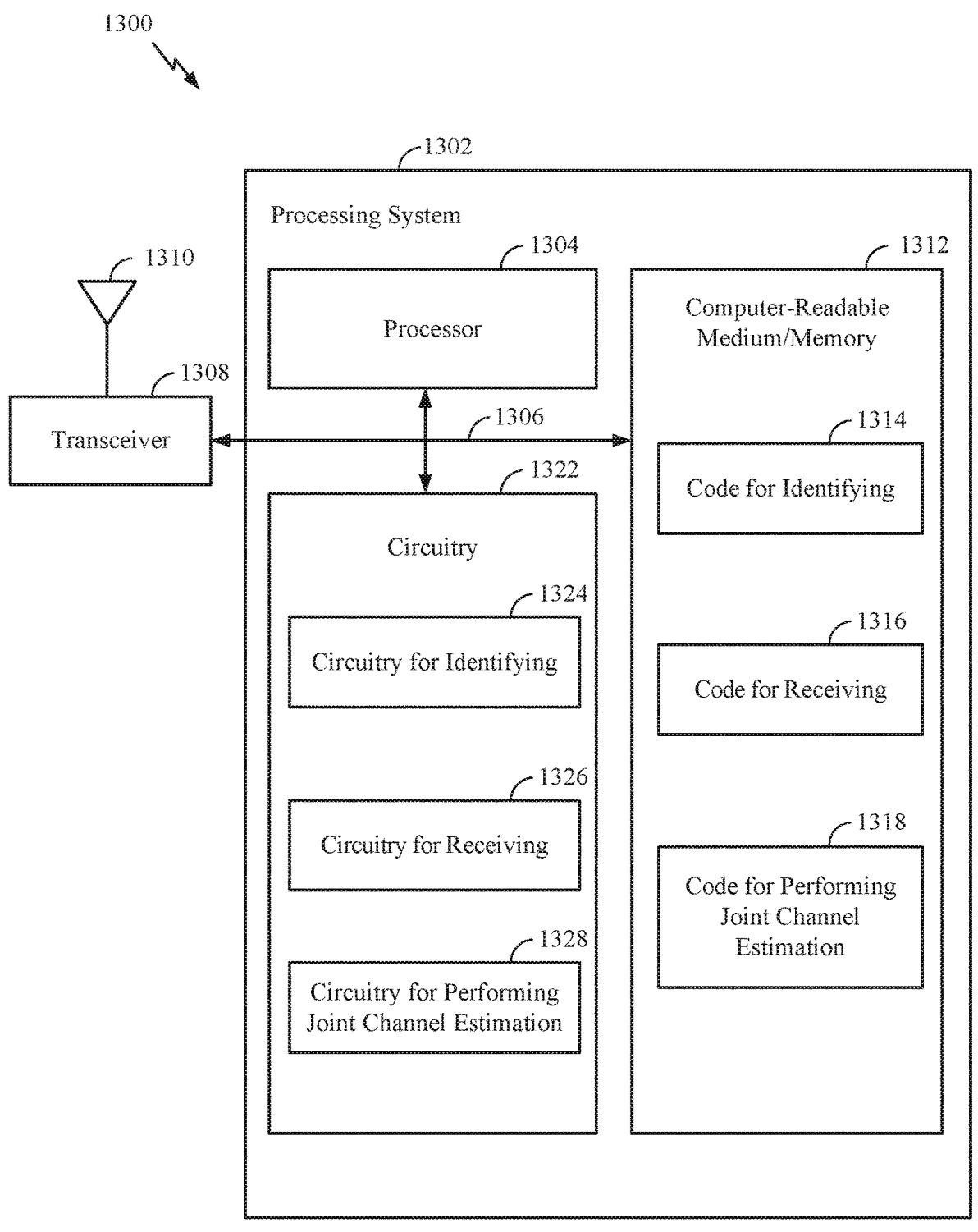
FIG. 13 illustrates a communications device (e.g., a BS) that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/ memory 1312 is configured to store instructions (e.g., computer-executable code) that when executed by the processor 1304, cause the processor 1304 to perform the operations illustrated in FIG. 11, or other operations for performing the various techniques discussed herein for joint channel estimation. In certain aspects, computer-readable medium/ memory 1312 stores code for identifying 1314, code for receiving 1316, and/or code for performing joint channel estimation 1318. In certain aspects, the processing system 1302 has circuitry 1322 configured to implement the code stored in the computer-readable medium/memory 1312. In certain aspects, the circuitry 1322 is coupled to the processor 1304 and/or the computer-readable medium/memory 1312 via the bus 1306. For example, the circuitry 1322 includes circuitry for identifying 1324, circuitry for receiving 1326, and/or circuitry for performing joint channel estimation 1328.

Example Aspects

In addition to the various aspects described above, specific combinations of aspects are within the scope of the disclosure, some of which are detailed below:

Aspect 1: A method of wireless communication by a user equipment, comprising: identifying that a first uplink transmission having demodulation reference signal (DMRS) bundling overlaps in time with a second uplink transmission in one or more transmission occasions; allocating, in response to the identification, a transmit power among the first uplink transmission and the second uplink transmission at the one or more transmission occasions based on the first uplink transmission having the DMRS bundling; and transmitting at least one of the first uplink transmission or the second uplink transmission in the one or more transmission occasions at the allocated transmit power.

Aspect 2: The method of Aspect 1, wherein allocating the transmit power comprises, if the first uplink transmission has a lower priority than the second uplink transmission in a priority order associated with the first uplink transmission and the second uplink transmission, cancelling at least one transmission occasion of the first uplink transmission if a total transmit power for the first uplink transmission and the second uplink transmission will exceed a transmit power threshold.

Aspect 3: The method of Aspect 2, wherein the at least one transmission occasion includes the one or more transmission occasions where the first uplink transmission overlaps in time with the second uplink transmission.

Aspect 4: The method of Aspect 3, wherein the at least one transmission occasion further includes one or more subsequent transmission occasions after the one or more transmission occasions where the first uplink transmission overlaps in time with the second uplink transmission.

Aspect 5: The method according to any of Aspects 2-4, wherein allocating the transmit power comprises allocating a consistent transmit power to the first uplink transmission across non-cancelled transmission occasions.

Aspect 6: The method of Aspect 1, wherein allocating the transmit power comprises, if the first uplink transmission has a lower priority than the second uplink transmission in a priority order associated with the first uplink transmission and the second uplink transmission: allocating a first transmit power to the first uplink transmission in one or more first transmission occasions occurring before the second uplink transmission; and allocating a second transmit power to the first uplink transmission in one or more second transmission occasions where the first uplink transmission overlaps in time with the second uplink transmission, wherein the second transmit power is the same as or less than the first transmit power.

Aspect 7: The method of Aspect 6, wherein allocating the transmit power comprises allocating the second transmit power to the first uplink transmission in one or more third transmission occasions after the one or more second transmission occasions such that the DMRS of the first uplink transmission is assumed to be bundled in the one or more first transmission occasions at the first transmit power and bundled in the one or more second transmission occasions and the one or more third transmission occasions at the second transmit power.

Aspect 8: The method of Aspect 6, wherein allocating the transmit power comprises allocating a third transmit power to the first uplink transmission in one or more third transmission occasions after the one or more second transmission occasions.

Aspect 9: The method of Aspect 8, wherein the DMRS of the first uplink transmission is assumed to be bundled in the one or more first transmission occasions at the first transmit power, bundled in the one or more second transmission occasions at the second transmit power, and bundled in the one or more third transmission occasions at the third transmit power.

Aspect 10: The method of Aspect 1, wherein the first uplink transmission takes priority over the second uplink transmission in a priority order associated with the first uplink transmission and the second uplink transmission, if the first uplink transmission starts earlier than the second uplink transmission, and if the first uplink transmission and the second uplink transmission have a same order in the priority order; and allocating the transmit power comprises allocating the transmit power among the first uplink transmission and the second uplink transmission based on the first uplink transmission taking priority over the second uplink transmission.

Aspect 11: The method of Aspect 10, wherein the first uplink transmission takes priority over the second uplink transmission in the priority order, also if the first uplink transmission and the second uplink transmission have a same priority index.

Aspect 12: The method according to any of Aspects 10 or 11, wherein the first uplink transmission takes priority over than the second uplink transmission in the priority order, also if the second uplink transmission has DMRS bundling.

Aspect 13: The method according to any of Aspects 10-12, wherein allocating the transmit power comprises allocating a first transmit power to the first uplink transmission based on the first uplink transmission taking priority over the second uplink transmission; and the first transmit power is constant for an entire duration of the first uplink transmission.

Aspect 14: The method of Aspect 13, wherein allocating the transmit power comprises allocating a second transmit power to the second uplink transmission such that a total of the first transmit power and the second transmit power is smaller than or equal to the transmit power threshold in the one or more transmission occasions.

Aspect 15: The method according to any of Aspects 1-14, further comprising receiving information scheduling the second uplink transmission; and wherein allocating the transmit power comprises allocating the transmit power based on the first uplink transmission starting before a time window after the reception of the information.

Aspect 16: The method of Aspects 1, further comprising: receiving information scheduling the second uplink transmission; and wherein allocating the transmit power comprises allocating the transmit power according to a priority order associated with the first uplink transmission and the second uplink transmission if the first uplink transmission does not start before a time window after the reception of the information.

Aspect 17: The method of Aspect 16, wherein allocating the transmit power comprises allocating a first transmit power to the first uplink transmission and a second transmit power to the second uplink transmission according to the priority order; and the first transmit power is constant for an entire duration of the first uplink transmission.

Aspect 18: The method according to any of Aspects 15-17, wherein the time window has a duration based on a physical uplink control channel (PUCCH) or a physical uplink shared channel (PUSCH) preparation time according to a minimum UE processing capability.

Aspect 19: The method according to any of Aspects 15-17, wherein the time window has a duration based on channel state information (CSI) computation time according to a minimum CSI computation delay.

Aspect 20: The method according to any of Aspects 1-5 or 10-19, wherein transmitting the first uplink transmission comprises transmitting the first uplink transmission over multiple slots or mini-slots with phase continuity and a consistent transmit power.

Aspect 21: The method according to any of Aspects 1-20, wherein transmitting the first uplink transmission and the second uplink transmission comprises transmitting the first uplink transmission via a first carrier and the second uplink transmission via a second carrier.

Aspect 22: The method according to any of Aspects 1-21, wherein the first uplink transmission includes at least one of a physical uplink shared channel transmission, a physical uplink control channel transmission, a physical random access channel transmission, or a sounding reference signal transmission.

Aspect 23: The method according to any of Aspects 2, 6, 10, or 15, wherein the priority order is a priority hierarchy of transmission types comprising a priority index and a payload type associated with the first uplink transmission and the second uplink transmission.

Aspect 24: A method of wireless communication by a network entity, comprising: identifying that a first uplink transmission from a user equipment (UE) overlaps in time with a second uplink transmission from the UE in one or more transmission occasions, the first uplink transmission having demodulation reference signal (DMRS) bundling; receiving a signal associated with the first uplink transmission; and performing a joint channel estimation with the received signal based on the identification.

Aspect 25: The method of Aspect 24, wherein performing the joint channel estimation comprises performing the joint channel estimation under an assumption that all transmission occasions associated with the first uplink transmission have DMRS bundling.

Aspect 26: The method of Aspect 24, wherein performing the joint channel estimation comprises, if the first uplink transmission has a lower priority than the second uplink transmission in a priority order associated with the first uplink transmission and the second uplink transmission, performing the joint channel estimation under an assumption that one or more first transmission occasions where the first uplink transmission overlaps in time with the second uplink transmission and one or more second transmission occasions after the one or more first transmission occasions have DMRS bundling.

Aspect 27: The method of Aspect 24, wherein performing the joint channel estimation comprises, if the first uplink transmission has a lower priority than the second uplink transmission in a priority order associated with the first uplink transmission and the second uplink transmission, performing the joint channel estimation under an assumption that one or more first transmission occasions before one or more second transmission occasions where the first uplink transmission overlaps in time with the second uplink transmission has DMRS bundling at a first transmit power, and that the one or more second transmission occasions and one or more third transmission occasions after the one or more second transmission occasions have DMRS bundling at a second transmit power.

Aspect 28: The method of Aspect 24, wherein performing the joint channel estimation comprises, if the first uplink transmission has a lower priority than the second uplink transmission in a priority order associated with the first uplink transmission and the second uplink transmission, performing the joint channel estimation under an assumption that one or more first transmission occasions before one or more second transmission occasions where the first uplink transmission overlaps in time with the second uplink transmission has DMRS bundling at a first transmit power, that the one or more second transmission occasions has DMRS bundling at a second transmit power, and that one or more third transmission occasions after the one or more second transmission occasions have DMRS bundling at a third transmit power.

Aspect 29: The method of Aspect 24, wherein performing the joint channel estimation comprises, if the first uplink transmission has a lower priority than the second uplink transmission in a priority order associated with the first uplink transmission and the second uplink transmission, performing the joint channel estimation under an assumption that one or more first transmission occasions before one or more second transmission occasions where the first uplink transmission overlaps in time with the second uplink transmission and one or more third transmission occasions after the one or more second transmission occasions have DMRS bundling, and that the first uplink transmission in the one or more second transmission occasions is cancelled.

Aspect 30: The method according to any of Aspects 24-28, wherein performing the joint channel estimation comprises performing the joint channel estimation under an assumption that the first uplink transmission is transmitted over multiple slots or mini-slots with phase continuity and a consistent transmit power.

Aspect 31: An apparatus for wireless communication, comprising: a memory; a processor coupled to the memory, the processor and the memory being configured to: identify that a first uplink transmission having demodulation reference signal (DMRS) bundling overlaps in time with a second uplink transmission in one or more transmission occasions, and allocate, in response to the identification, a transmit power among the first uplink transmission and the second uplink transmission at the one or more transmission occasions based on the first uplink transmission having the DMRS bundling; and a transmitter configured to transmit at least one of the first uplink transmission or the second uplink transmission in the one or more transmission occasions at the allocated transmit power.

Aspect 32: The apparatus of Aspect 31, wherein the processor and the memory are further configured to cancel at least one transmission occasion of the first uplink transmission if a total transmit power for the first uplink transmission and the second uplink transmission will exceed a transmit power threshold, and if the first uplink transmission has a lower priority than the second uplink transmission in a priority order associated with the first uplink transmission and the second uplink transmission.

Aspect 33: The apparatus of Aspect 32, wherein the at least one transmission occasion includes the one or more transmission occasions where the first uplink transmission overlaps in time with the second uplink transmission.

Aspect 34: The apparatus of Aspect 33, wherein the at least one transmission occasion further includes one or more subsequent transmission occasions after the one or more transmission occasions where the first uplink transmission overlaps in time with the second uplink transmission.

Aspect 35: The apparatus according to Aspects 32 or 33, wherein the processor and the memory are further configured to allocate a consistent transmit power to the first uplink transmission across non-cancelled transmission occasions.

Aspect 36: The apparatus of Aspect 31, wherein the processor and the memory are further configured to, if the first uplink transmission has a lower priority than the second uplink transmission in a priority order associated with the first uplink transmission and the second uplink transmission: allocate a first transmit power to the first uplink transmission in one or more first transmission occasions occurring before the second uplink transmission; and allocate a second transmit power to the first uplink transmission in one or more second transmission occasions where the first uplink transmission overlaps in time with the second uplink transmission, wherein the second transmit power is the same as or less than the first transmit power.

Aspect 37: The apparatus of Aspect 36, wherein the processor and the memory are further configured to allocate the second transmit power to the first uplink transmission in one or more third transmission occasions after the one or more second transmission occasions such that the DMRS of the first uplink transmission is assumed to be bundled in the one or more first transmission occasions at the first transmit power and bundled in the one or more second transmission occasions and the one or more third transmission occasions at the second transmit power.

Aspect 38: The apparatus of Aspect 36, wherein the processor and the memory are further configured to allocate a third transmit power to the first uplink transmission in one or more third transmission occasions after the one or more second transmission occasions, wherein the DMRS of the first uplink transmission is assumed to be bundled in the one or more first transmission occasions at the first transmit power, bundled in the one or more second transmission occasions at the second transmit power, and bundled in the one or more third transmission occasions at the third transmit power Aspect 39: The apparatus of Aspect 31, wherein the first uplink transmission takes priority over the second uplink transmission in a priority order associated with the first uplink transmission and the second uplink transmission, if the first uplink transmission starts earlier than the second uplink transmission, and if the first uplink transmission and the second uplink transmission have a same order in the priority order; and wherein the processor and the memory are further configured to allocate the transmit power among the first uplink transmission and the second uplink transmission based on the first uplink transmission taking priority over the second uplink transmission.

Aspect 40: The apparatus of Aspect 39, wherein the first uplink transmission takes priority over the second uplink transmission in the priority order, also if the first uplink transmission and the second uplink transmission have a same priority index.

Aspect 41: The apparatus according to any of Aspects 39 or 40, wherein the first uplink transmission takes priority over than the second uplink transmission in the priority order, also if the second uplink transmission has DMRS bundling.

Aspect 42: The apparatus according to any of Aspects 39-41, wherein the processor and the memory are further configured to allocate a first transmit power to the first uplink transmission based on the first uplink transmission taking priority over the second uplink transmission, wherein the first transmit power is constant for an entire duration of the first uplink transmission.

Aspect 43: The apparatus of Aspect 42, wherein the processor and the memory are further configured to allocate a second transmit power to the second uplink transmission such that a total of the first transmit power and the second transmit power is smaller than or equal to the transmit power threshold in the one or more transmission occasions.

Aspect 44: The apparatus according to any of Aspects 31-43, further comprising: a receiver configured to receive information scheduling the second uplink transmission; and wherein the processor and the memory are further configured to allocate the transmit power based on the first uplink transmission starting before a time window after the reception of the information.

Aspect 45: The apparatus of Aspects 31, further comprising: a receiver configured to receive information scheduling the second uplink transmission; and wherein the processor and the memory are further configured to allocate the transmit power according to a priority order associated with the first uplink transmission and the second uplink transmission if the first uplink transmission does not start before a time window after the reception of the information.

Aspect 46: The apparatus of Aspect 45, wherein: the processor and the memory are further configured to allocate a first transmit power to the first uplink transmission and a second transmit power to the second uplink transmission according to the priority order; and the first transmit power is constant for an entire duration of the first uplink transmission.

Aspect 47: The apparatus according to any of Aspects 44-46, wherein the time window has a duration based on a physical uplink control channel (PUCCH) or a physical uplink shared channel (PUSCH) preparation time according to a minimum UE processing capability.

Aspect 48: The apparatus according to any of Aspects 44-46, wherein the time window has a duration based on channel state information (CSI) computation time according to a minimum CSI computation delay.

Aspect 49: The apparatus according to any of Aspects 31-35 or 39-48, wherein the transmitter is further configured to transmit the first uplink transmission over multiple slots or mini-slots with phase continuity and a consistent transmit power.

Aspect 50: The apparatus according to any of Aspects 31-49, wherein the transmitter is further configured to transmit the first uplink transmission via a first carrier and the second uplink transmission via a second carrier.

Aspect 51: The apparatus according to any of Aspects 31-50, wherein the first uplink transmission includes at least one of a physical uplink shared channel transmission, a physical uplink control channel transmission, a physical random access channel transmission, or a sounding reference signal transmission.

Aspect 52: The apparatus according to any of Aspects 32, 36, 39, or 44, wherein the priority order is a priority hierarchy of transmission types comprising a priority index and a payload type associated with the first uplink transmission and the second uplink transmission.

Aspect 53: An apparatus for wireless communication, comprising: a receiver configured to receive, from a user equipment (UE), a signal associated with a first uplink transmission; a memory; and a processor coupled to the memory, the processor and the memory being configured to: identify that a first uplink transmission from the UE overlaps in time with a second uplink transmission from the UE in one or more transmission occasions, the first uplink transmission having demodulation reference signal (DMRS) bundling, and perform a joint channel estimation with the received signal based on the identification.

Aspect 54: The apparatus of Aspect 53, wherein the processor and the memory are further configured to perform the joint channel estimation under an assumption that all transmission occasions associated with the first uplink transmission have DMRS bundling.

Aspect 55: The apparatus of Aspect 53, wherein the processor and the memory are further configured to perform the joint channel estimation under an assumption that one or more first transmission occasions where the first uplink transmission overlaps in time with the second uplink transmission and one or more second transmission occasions after the one or more first transmission occasions have DMRS bundling, if the first uplink transmission has a lower priority than the second uplink transmission in a priority order associated with the first uplink transmission and the second uplink transmission.

Aspect 56: The apparatus of Aspect 53, wherein the processor and the memory are further configured to perform the joint channel estimation under an assumption that one or more first transmission occasions before one or more second transmission occasions where the first uplink transmission overlaps in time with the second uplink transmission has DMRS bundling at a first transmit power, and that the one or more second transmission occasions and one or more third transmission occasions after the one or more second transmission occasions have DMRS bundling at a second transmit power, if the first uplink transmission has a lower priority than the second uplink transmission in a priority order associated with the first uplink transmission and the second uplink transmission.

Aspect 57: The apparatus of Aspect 53, wherein the processor and the memory are further configured to perform the joint channel estimation under an assumption that one or more first transmission occasions before one or more second transmission occasions where the first uplink transmission overlaps in time with the second uplink transmission has DMRS bundling at a first transmit power, that the one or more second transmission occasions has DMRS bundling at a second transmit power, and that one or more third transmission occasions after the one or more second transmission occasions have DMRS bundling at a third transmit power, if the first uplink transmission has a lower priority than the second uplink transmission in a priority order associated with the first uplink transmission and the second uplink transmission.

Aspect 58: The apparatus of Aspect 53, wherein the processor and the memory are further configured to perform the joint channel estimation under an assumption that one or more first transmission occasions before one or more second transmission occasions where the first uplink transmission overlaps in time with the second uplink transmission and one or more third transmission occasions after the one or more second transmission occasions have DMRS bundling, and that the first uplink transmission in the one or more second transmission occasions is cancelled, if the first uplink transmission has a lower priority than the second uplink transmission in a priority order associated with the first uplink transmission and the second uplink transmission.

Aspect 59: An apparatus for wireless communication, comprising: means for identifying that a first uplink transmission having demodulation reference signal (DMRS) bundling overlaps in time with a second uplink transmission in one or more transmission occasions; means for allocating, in response to the identification, a transmit power among the first uplink transmission and the second uplink transmission at the one or more transmission occasions based on the first uplink transmission having the DMRS bundling; and means for transmitting at least one of the first uplink transmission or the second uplink transmission in the one or more transmission occasions at the allocated transmit power.

Aspect 60: An apparatus for wireless communication, comprising: means for identifying that a first uplink transmission from a user equipment (UE) overlaps in time with a second uplink transmission from the UE in one or more transmission occasions, the first uplink transmission having demodulation reference signal (DMRS) bundling; means for receiving a signal associated with the first uplink transmission; and means for performing a joint channel estimation with the received signal based on the identification.

Aspect 61: A computer readable medium having instructions stored thereon for: identifying that a first uplink transmission having demodulation reference signal (DMRS) bundling overlaps in time with a second uplink transmission in one or more transmission occasions; allocating, in response to the identification, a transmit power among the first uplink transmission and the second uplink transmission at the one or more transmission occasions based on the first uplink transmission having the DMRS bundling; and transmitting at least one of the first uplink transmission or the second uplink transmission in the one or more transmission occasions at the allocated transmit power.

Aspect 62: A computer readable medium having instructions stored thereon for: identifying that a first uplink transmission from a user equipment (UE) overlaps in time with a second uplink transmission from the UE in one or more transmission occasions, the first uplink transmission having demodulation reference signal (DMRS) bundling;

receiving a signal associated with the first uplink transmission; and performing a joint channel estimation with the received signal based on the identification.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6 and/or FIG. 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communication, comprising:
   one or more memories comprising executable instructions; and
   one or more processors configured to execute the executable instructions to cause the apparatus to:
      identify that a first uplink transmission having demodulation reference signal (DMRS) bundling overlaps in time with a second uplink transmission in one or more transmission occasions;
      allocate, in response to the identification, a transmit power among the first uplink transmission and the second uplink transmission at the one or more transmission occasions based on the first uplink transmission having the DMRS bundling; and
      transmit at least one of the first uplink transmission or the second uplink transmission in the one or more transmission occasions at the allocated transmit power.

2. The apparatus of claim 1, wherein the one or more processors are further configured to cause the apparatus to cancel at least one transmission occasion of the first uplink transmission if a total transmit power for the first uplink transmission and the second uplink transmission will exceed a transmit power threshold, and if the first uplink transmission has a lower priority than the second uplink transmission in a priority order associated with the first uplink transmission and the second uplink transmission.

3. The apparatus of claim 2, wherein:
   the at least one transmission occasion includes the one or more transmission occasions where the first uplink transmission overlaps in time with the second uplink transmission.

4. The apparatus of claim 3, wherein:
   the at least one transmission occasion further includes one or more subsequent transmission occasions after the one or more transmission occasions where the first uplink transmission overlaps in time with the second uplink transmission.

5. The apparatus of claim 2, wherein the one or more processors are further configured to cause the apparatus to allocate a consistent transmit power to the first uplink transmission across non-cancelled transmission occasions.

6. The apparatus of claim 1, wherein the one or more processors are further configured to cause the apparatus to, if the first uplink transmission has a lower priority than the second uplink transmission in a priority order associated with the first uplink transmission and the second uplink transmission:

allocate a first transmit power to the first uplink transmission in one or more first transmission occasions occurring before the second uplink transmission; and allocate a second transmit power to the first uplink transmission in one or more second transmission occasions where the first uplink transmission overlaps in time with the second uplink transmission, wherein the second transmit power is the same as or less than the first transmit power.

7. The apparatus of claim 6, wherein the one or more processors are further configured to cause the apparatus to:

allocate the second transmit power to the first uplink transmission in one or more third transmission occasions after the one or more second transmission occasions such that the DMRS of the first uplink transmission is assumed to be bundled in the one or more first transmission occasions at the first transmit power and bundled in the one or more second transmission occasions and the one or more third transmission occasions at the second transmit power.

8. The apparatus of claim 6, wherein:

the one or more processors are further configured to cause the apparatus to allocate a third transmit power to the first uplink transmission in one or more third transmission occasions after the one or more second transmission occasions; and the DMRS of the first uplink transmission is assumed to be;

bundled in the one or more first transmission occasions at the first transmit power, bundled in the one or more second transmission occasions at the second transmit power, and bundled in the one or more third transmission occasions at the third transmit power.

9. The apparatus of claim 1, wherein:

the first uplink transmission takes priority over the second uplink transmission in a priority order associated with the first uplink transmission and the second uplink transmission, if the first uplink transmission starts earlier than the second uplink transmission, and if the first uplink transmission and the second uplink transmission have a same order in the priority order; and the one or more processors are further configured to cause the apparatus to allocate the transmit power among the first uplink transmission and the second uplink transmission based on the first uplink transmission taking priority over the second uplink transmission.

10. The apparatus of claim 9, wherein:

the first uplink transmission takes priority over the second uplink transmission in the priority order, also if the first uplink transmission and the second uplink transmission have a same priority index.

11. The apparatus of claim 9, wherein:

the first uplink transmission takes priority over than the second uplink transmission in the priority order, also if the second uplink transmission has DMRS bundling.

12. The apparatus of claim 9, wherein:

the one or more processors are further configured to cause the apparatus to allocate a first transmit power to the first uplink transmission based on the first uplink transmission taking priority over the second uplink transmission; and the first transmit power is constant for an entire duration of the first uplink transmission.

13. The apparatus of claim 12, wherein the one or more processors are further configured to cause the apparatus to allocate a second transmit power to the second uplink transmission such that a total of the first transmit power and the second transmit power is smaller than or equal to the transmit power threshold in the one or more transmission occasions.

14. The apparatus of claim 1, wherein the one or more processors are further configured to cause the apparatus to:

receive information scheduling the second uplink transmission; and allocate the transmit power based on the first uplink transmission starting before a time window after the reception of the information.

15. The apparatus of claim 1, wherein the one or more processors are further configured to cause the apparatus to:

receive information scheduling the second uplink transmission; and allocate the transmit power according to a priority order associated with the first uplink transmission and the second uplink transmission if the first uplink transmission does not start before a time window after the reception of the information.

16. The apparatus of claim 15, wherein:

the one or more processors are further configured to cause the apparatus to allocate a first transmit power to the first uplink transmission and a second transmit power to the second uplink transmission according to the priority order; and the first transmit power is constant for an entire duration of the first uplink transmission.

17. The apparatus of claim 14, wherein the time window has a duration based on a physical uplink control channel (PUCCH) or a physical uplink shared channel (PUSCH) preparation time according to a minimum UE processing capability.

18. The apparatus of claim 14, wherein the time window has a duration based on channel state information (CSI) computation time according to a minimum CSI computation delay.

19. The apparatus of claim 1, wherein the one or more processors are further configured to transmit the first uplink transmission over multiple slots or mini-slots with phase continuity and a consistent transmit power.

20. The apparatus of claim 1, wherein the one or more processors are further configured to transmit the first uplink transmission via a first carrier and the second uplink transmission via a second carrier.

21. The apparatus of claim 1, wherein the first uplink transmission includes at least one of a physical uplink shared channel transmission, a physical uplink control channel transmission, a physical random access channel transmission, or a sounding reference signal transmission.

22. The apparatus of claim 2, wherein the priority order is a priority hierarchy of transmission types comprising a priority index and a payload type associated with the first uplink transmission and the second uplink transmission.

23. An apparatus for wireless communication, comprising:

one or more memories comprising executable instructions; and one or more processors configured to execute the executable instructions to cause the apparatus to:

receive, from a user equipment (UE), a signal associated with a first uplink transmission;

identify that a first uplink transmission from the UE overlaps in time with a second uplink transmission from the UE in one or more transmission occasions, the first uplink transmission having demodulation reference signal (DMRS) bundling; and perform a joint channel estimation with the received signal based on the identification.

24. The apparatus of claim 23, the one or more processors are further configured to cause the apparatus to perform the joint channel estimation under an assumption that all transmission occasions associated with the first uplink transmission have DMRS bundling.

25. The apparatus of claim 23, the one or more processors are further configured to cause the apparatus to perform the joint channel estimation under an assumption that one or more first transmission occasions where the first uplink transmission overlaps in time with the second uplink transmission and one or more second transmission occasions after the one or more first transmission occasions have DMRS bundling, if the first uplink transmission has a lower priority than the second uplink transmission in a priority order associated with the first uplink transmission and the second uplink transmission.

26. The apparatus of claim 23, the one or more processors are further configured to cause the apparatus to perform the joint channel estimation under an assumption that one or more first transmission occasions before one or more second transmission occasions where the first uplink transmission overlaps in time with the second uplink transmission has DMRS bundling at a first transmit power, and that the one or more second transmission occasions and one or more third transmission occasions after the one or more second transmission occasions have DMRS bundling at a second transmit power, if the first uplink transmission has a lower priority than the second uplink transmission in a priority order associated with the first uplink transmission and the second uplink transmission.

27. The apparatus of claim 23, the one or more processors are further configured to cause the apparatus to perform the joint channel estimation under an assumption that one or more first transmission occasions before one or more second transmission occasions where the first uplink transmission overlaps in time with the second uplink transmission has DMRS bundling at a first transmit power, that the one or more second transmission occasions has DMRS bundling at a second transmit power, and that one or more third transmission occasions after the one or more second transmission occasions have DMRS bundling at a third transmit power, if the first uplink transmission has a lower priority than the second uplink transmission in a priority order associated with the first uplink transmission and the second uplink transmission.

28. The apparatus of claim 23, the one or more processors are further configured to cause the apparatus to perform the joint channel estimation under an assumption that one or more first transmission occasions before one or more second transmission occasions where the first uplink transmission overlaps in time with the second uplink transmission and one or more third transmission occasions after the one or more second transmission occasions have DMRS bundling, and that the first uplink transmission in the one or more second transmission occasions is cancelled, if the first uplink transmission has a lower priority than the second uplink transmission in a priority order associated with the first uplink transmission and the second uplink transmission.

29. A method of wireless communication by a user equipment, comprising:

identifying that a first uplink transmission having demodulation reference signal (DMRS) bundling overlaps in time with a second uplink transmission in one or more transmission occasions;

allocating, in response to the identification, a transmit power among the first uplink transmission and the second uplink transmission at the one or more transmission occasions based on the first uplink transmission having the DMRS bundling; and transmitting at least one of the first uplink transmission or the second uplink transmission in the one or more transmission occasions at the allocated transmit power.

30. A method of wireless communication by a network entity, comprising:

identifying that a first uplink transmission from a user equipment (UE) overlaps in time with a second uplink transmission from the UE in one or more transmission occasions, the first uplink transmission having demodulation reference signal (DMRS) bundling;

receiving a signal associated with the first uplink transmission; and performing a joint channel estimation with the received signal based on the identification.

* * * * *